(12) United States Patent
Kim et al.

(10) Patent No.: US 11,463,848 B2
(45) Date of Patent: Oct. 4, 2022

(54) ELECTRONIC DEVICE FOR DETERMINING EXTERNAL ELECTRONIC DEVICE HAVING GENERATED EM SIGNAL

(71) Applicant: Samsung Electronics Co., Ltd., Suwon-si (KR)

(72) Inventors: Seungnyun Kim, Suwon-si (KR); Doosuk Kang, Suwon-si (KR); Bokun Choi, Suwon-si (KR); Yongsang Yun, Suwon-si (KR); Jinchul Choi, Suwon-si (KR); Hanjib Kim, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 17/265,055

(22) PCT Filed: Jul. 25, 2019

(86) PCT No.: PCT/KR2019/009220
§ 371 (c)(1),
(2) Date: Feb. 1, 2021

(87) PCT Pub. No.: WO2020/027492
PCT Pub. Date: Feb. 6, 2020

(65) Prior Publication Data
US 2021/0329429 A1 Oct. 21, 2021

(30) Foreign Application Priority Data

Jul. 30, 2018 (KR) .................. 10-2018-0088609

(51) Int. Cl.
*H04W 4/30* (2018.01)
*H04W 8/22* (2009.01)
*H04B 17/318* (2015.01)

(52) U.S. Cl.
CPC .............. *H04W 4/30* (2018.02); *H04W 8/22* (2013.01); *H04B 17/318* (2015.01)

(58) Field of Classification Search
CPC ...... G08G 1/0141; G08G 1/0145; G08G 1/08; G08G 1/012; G08G 1/04; G08G 1/0116; G08G 1/166
(Continued)

(56) References Cited

U.S. PATENT DOCUMENTS 8,909,356 B2* 12/2014 Honma ............... H04L 12/2809
709/224
9,137,254 B2 9/2015 Bilbrey et al.
(Continued)

FOREIGN PATENT DOCUMENTS

KR 10-2016-0045463 A 4/2016
KR 10-2017-0098160 A 8/2017

OTHER PUBLICATIONS

Manoj Gulati, An In Depth Study into Using EMI Signatures for Appliance Identification, published Sep. 15, 2014.

*Primary Examiner* — Congvan Tran
(74) *Attorney, Agent, or Firm* — Jefferson IP Law, LLP

(57) ABSTRACT

An electronic device according to an embodiment of the present disclosure may include a housing, a touch screen display exposed through a portion of the housing, at least one wireless communication circuit, an electromagnetic (EM) sensing circuit configured to sense an EM signal having a frequency band of 1 MHz or less, a processor operatively connected to the display, the wireless communication circuit, and the EM sensing circuit, and a memory configured to store at least one reference EM profile and information about at least one external access point and operatively connected to the processor, wherein the memory may store instructions that cause, when executed, the processor to obtain an EM signal from an external electronic
(Continued)

device via the EM sensing circuit, identify a reference EM profile corresponding to the obtained EM signal based on the at least one reference EM profile, determine a location of the electronic device at least partially based on information about an external access point connected to the electronic device via the at least one wireless communication circuit, identify the external electronic device at least partially based on the identified reference EM profile, and display a graphic user interface (GUI) on the touch screen display at least partially based on information about the identified external electronic device.

15 Claims, 16 Drawing Sheets

(58) Field of Classification Search
USPC .......................................................... 370/310
See application file for complete search history.

(56) References Cited

U.S. PATENT DOCUMENTS

| | | | |
|---|---|---|---|
| 9,445,267 | B2 | 9/2016 | Varoglu et al. |
| 9,930,438 | B2 | 3/2018 | Lee et al. |
| 10,321,429 | B2 | 6/2019 | Kim et al. |
| 10,782,204 | B2 * | 9/2020 | Picardi ..................... E03B 7/09 |
| 2003/0167139 | A1 | 9/2003 | Swartz et al. |
| 2011/0162048 | A1 | 6/2011 | Bilbrey et al. |
| 2013/0247117 | A1 * | 9/2013 | Yamada ................ H04W 4/029 |
| | | | 340/12.5 |
| 2013/0281155 | A1 * | 10/2013 | Ogata ..................... H02J 50/70 |
| | | | 455/556.1 |
| 2014/0045458 | A1 * | 2/2014 | Beilis ................... H04W 12/06 |
| | | | 455/411 |
| 2014/0173758 | A1 | 6/2014 | Bilbrey et al. |
| 2014/0199967 | A1 | 7/2014 | Varoglu et al. |
| 2016/0112792 | A1 | 4/2016 | Lee et al. |
| 2017/0245198 | A1 | 8/2017 | Kim et al. |
| 2019/0012604 | A1 * | 1/2019 | Hiratsuka ............... H02J 13/00 |
| 2020/0242922 | A1 * | 7/2020 | Dulberg ........... G08G 1/096708 |

* cited by examiner

ELECTRONIC DEVICE FOR DETERMINING EXTERNAL ELECTRONIC DEVICE HAVING GENERATED EM SIGNAL

TECHNICAL FIELD

Various embodiments of the present disclosure relate to a technique of determining an external electronic device emitting an EM signal.

BACKGROUND ART

Electronic devices may emit a unique electromagnetic (EM) signal. For example, components included in an electronic device may emit a unique EM signal when operating. It may be possible to use an EM signal to identify an electronic device emitting the EM signal. For example, it may be possible to use the EM signal to classify products belonging to the same product group manufactured by the same manufacturer by model.

DISCLOSURE OF THE INVENTION

Technical Problem

An electronic device may recognize the type of a device by distinguishing an EM signal. However, since an electronic device may recognize only the type of an external electronic device, the electronic device may not distinguish a target device among a plurality of electronic devices of the same type. It is necessary for an electronic device to distinguish a target device in order to provide, to a user, a service involving interoperation between devices, such as information sharing, device control, or the like.

Various embodiments of the present disclosure provide an electronic device and method for determining an external electronic device emitting an EM signal in an environment in which external electronic devices of the same type are arranged.

Technical Solution

An electronic device according to an embodiment of the present disclosure may include a housing, a touch screen display exposed through a portion of the housing, at least one wireless communication circuit, an electromagnetic (EM) sensing circuit configured to sense an EM signal having a frequency band of 1 MHz or less, a processor operatively connected to the display, the wireless communication circuit, and the EM sensing circuit, and a memory configured to store at least one reference EM profile and information about at least one external access point and operatively connected to the processor, wherein the memory may store instructions that cause, when executed, the processor to obtain an EM signal from an external electronic device via the EM sensing circuit, identify a reference EM profile corresponding to the obtained EM signal based on at least one reference EM profile, determine a location of the electronic device at least partially based on information about an external access point connected to the electronic device via the at least one wireless communication circuit, identify the external electronic device at least partially based on the identified reference EM profile, and display a graphic user interface (GUI) on the touch screen display at least partially based on information about the identified external electronic device.

Furthermore, an electronic device according to an embodiment of the present disclosure may include a touch screen display, a wireless communication circuit, an electromagnetic (EM) sensing circuit, which receives an EM signal, at least one processor operatively connected to the touch screen display, the wireless communication circuit, and the EM sensing circuit, and a memory configured to store at least one reference EM profile and operatively connected to the at least one processor, wherein the memory may store instructions that cause, when executed, the processor to obtain an EM signal from an external electronic device via the EM sensing circuit, identify a reference EM profile corresponding to the obtained EM signal based on the at least one reference EM profile, transmit the identified reference EM profile and a request signal for searching for the external electronic device to an external server via the wireless communication circuit, receive information about the external electronic device that satisfies a pre-specified condition from the external server via the wireless communication circuit based on the reference EM profile, and display an object indicating the external electronic device on the touch screen display based on the received information.

A storage medium which stores computer-readable instructions according to an embodiment of the present disclosure may cause, when the instructions are executed by a processor of an electronic device, the electronic device to perform an operation of executing an application, an operation of obtaining an EM signal via an EM sensing circuit, an operation of transmitting first information about the obtained EM signal to a first external server, an operation of receiving second information about the type of an external electronic device corresponding to the EM signal from a first external server, an operation of transmitting the received second information and context information about a current situation of the electronic device to a second external server, and an operation of receiving, from the second external server, third information about an external electronic device that satisfies a pre-specified condition among a plurality of external electronic devices based on the second information and the context information, and displaying an object indicating the external electronic device on a touch screen display of the electronic device based on the third information.

Advantageous Effects

According to various embodiments of the present disclosure, when a plurality of external electronic devices of the same type are present, an electronic device may determine an external electronic device emitting an EM signal.

According to various embodiments of the present disclosure, an electronic device may easily establish a wireless connection between the electronic device and an external electronic device to be controlled by a user.

Besides, various effects may be provided that are directly or indirectly identified through the present disclosure.

BRIEF DESCRIPTION OF THE DRAWINGS

With respect to the description of the drawings, the same or similar reference signs may be used for the same or similar elements.

MODE FOR CARRYING OUT THE INVENTION

Hereinafter, various embodiments of the present disclosure will be described in detail with reference to the accompanying drawings. However, it should be understood that the present disclosure is not limited to specific embodiments, but rather includes various modifications, equivalents and/or alternatives of various embodiments of the present disclosure.

Figure 1:
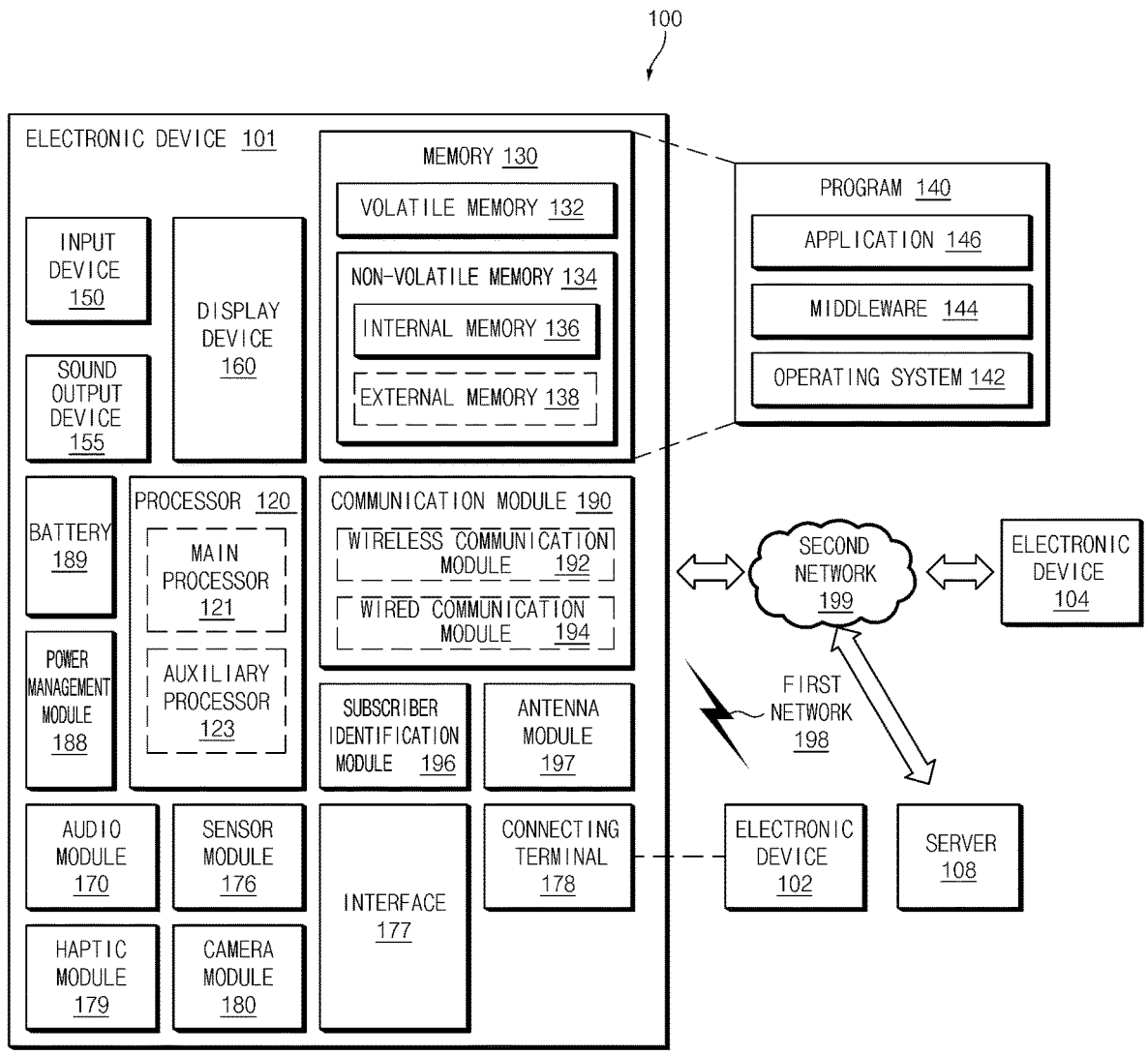
FIG. 1 illustrates an electronic device in a network environment according to various embodiments of the present disclosure.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented in an embedded form in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, the processor 120 may load a command or data received from another component (e.g., the sensor module 176 or the communication module 190) in a volatile memory 132 as at least portion of the data processing or computation, may process the command or the data stored in the volatile memory 132, and may store resulting data in a non-volatile memory 134. According to an embodiment, the processor 120 may include a main processor 121 (e.g., a central processing unit or an application processor), and an auxiliary processor 123 (e.g., a graphics processing unit, an image signal processor, a sensor hub processor, or a communication processor) that is operable independently of or in conjunction with the main processor 121. Additionally or alternatively, the auxiliary processor 123 may be configured to consume less power than the main processor 121, or to be specific to a specified function. The auxiliary processor 123 may be implemented separately from or as a portion of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as a portion of another component (e.g., the camera module 180 or the communication module 190) functionally related to the auxiliary processor 123.

The memory 130 may store various data used by at least one component (e.g., the processor 120 or the sensor module 176) of the electronic device 101. The data may include, for example, software (e.g., the program 140) and input data or output data for a command related thereto. The memory 130 may include the volatile memory 132 or the non-volatile memory 134.

According to an embodiment, the memory 130 may store at least one reference EM profile and information about at least one external access point.

According to an embodiment, the reference EM profile may include information about an external electronic device and an EM signal corresponding to the external electronic device. For example, the reference EM profile may be associated with product identification of the external electronic device. According to various embodiments, the reference EM profile may be data that may be differentiated according to a characteristic (e.g., the type of a component, or arrangement of a component) of an electronic device.

According to an embodiment, the information about an access point may include at least one of a device name, a MAC address, or location information of the access point.

According to an embodiment, the memory 130 may include information about a plurality of external electronic devices. The information about a plurality of external electronic devices may include, for example, a location, model name, manufacturer, or manufacturing date of an external electronic device. According to an embodiment, this information may include information about an access point to which the plurality of external electronic devices are connected.

According to an embodiment, the memory 130 may store information about a user account related to an electronic device.

The program 140 may be stored in the memory 130 as software, and may include, for example, an operating system 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented separately from or as a portion of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry configured to detect a touch, or sensor circuitry (e.g., a pressure sensor) configured to measure the intensity of force incurred by the touch.

The audio module 170 may convert a sound into an electrical signal and vice versa. According to an embodiment, the audio module 170 may obtain the sound via the input device 150, or output the sound via the sound output device 155 or an external electronic device (e.g., an electronic device 102) (e.g., a speaker or a headphone) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, an SD card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least a portion of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently of the processor 120 (e.g., an application processor) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication module). A corresponding one of these communication modules may communicate with the external electronic device via a first network 1098 (e.g., a short-range communication network, such as Bluetooth, Wi-Fi direct, or infrared data association (IrDA)) or a second network 1099 (e.g., a long-range communication network, such as a cellular network, the Internet, or a computer network (e.g., LAN or WAN). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device). According to an embodiment, the antenna module 197 may include one or more antennas, and, in such a case, at least one antenna appropriate for a communication scheme used in the communication network, such as the first network 198 or the second network 199, may be selected, for example, by the communication module 190. The signal or the power may be transmitted or received between the communication module 190 and the external electronic device via the selected at least one antenna.

At least portion of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Figure 2A:
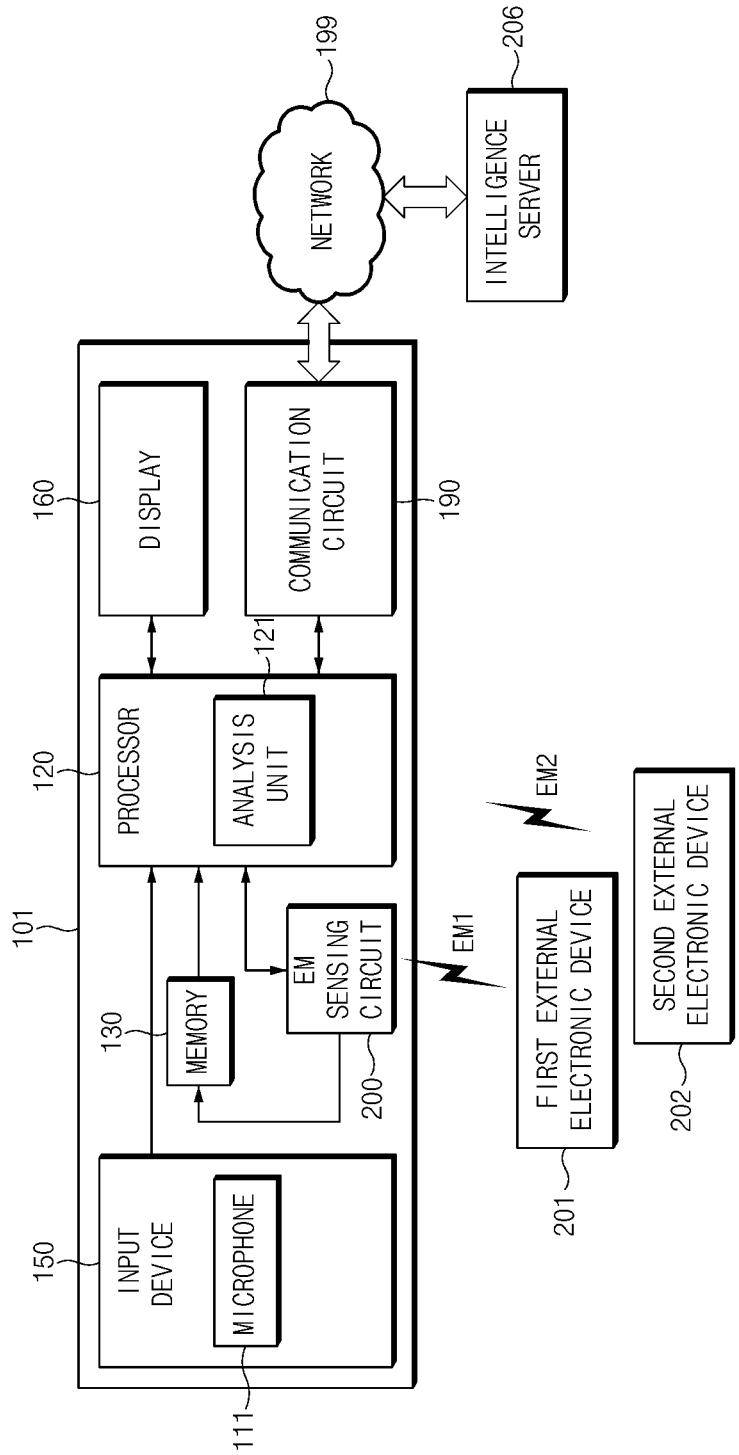
FIG. 2A is a block diagram illustrating an electronic device according to an embodiment.
Figure 2B:
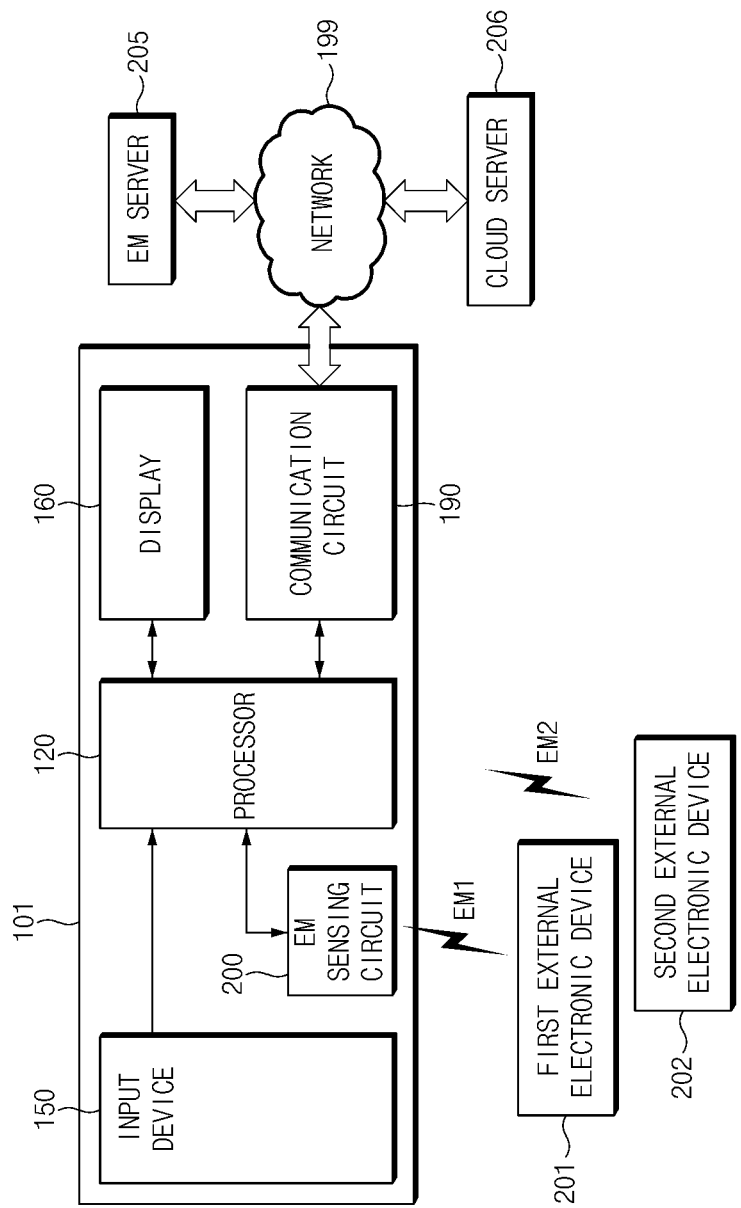
FIG. 2B is a block diagram illustrating an electronic device according to another embodiment.

According to an embodiment, commands or data may be transmitted or received between the electronic device 101 and the external electronic device 104 via the server 108 coupled with the second network 199. Each of the electronic devices 102 and 104 may be a device of the same type as or a different type from the electronic device 101. According to an embodiment, all or some of operations to be executed by the electronic device 101 may be executed by one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least a portion of the function or the service. The one or more external electronic devices receiving the request may perform the at least a portion of the function or the service requested, or an additional function or an additional service related to the request, and may transfer an outcome of the performing to the electronic device 101. The electronic device 101 may provide the outcome, with or without further processing of the outcome, as at least a portion of a response to the request. To this end, for example, a cloud computing, distributed computing, or client-server computing technology may be used FIG. 2A is a block diagram illustrating an electronic device 101 according to an embodiment. FIG. 2B is a block diagram illustrating an electronic device 101 according to another embodiment.

The electronic device 101 according to an embodiment may include an input device 150, a display 160, a communication circuit 190, a processor 120, and an EM sensing circuit 200.

The input device 150 may obtain various types of input performed by a user. The input device 150 may receive, from the outside of the electronic device 101, a command or data to be input to the electronic device 101. A user input may include at least one of a touch input, a drag input, or a voice input.

The display 160 may display, as an image or text, information about a user input obtained from the input device 150. For example, the display 160 may display contents of an obtained voice input as text. When the electronic device 101 performs an operation corresponding to an obtained user input, the display 160 may display an image showing an execution operation of the electronic device 101.

According to an embodiment, the display 160 may be integrated with a touch panel that is the input device 150 so as to form a touch screen display.

The communication circuit 190 may transmit, via a network 199, information stored in the electronic device 101 to the server 108 (e.g., an EM server 205 or a cloud server 206). The communication circuit 190 may transmit unique information of the electronic device 101 to the server. For example, the communication circuit 190 may transmit information about a user account of the electronic device 101 to the server. Furthermore, the communication circuit 190 may transmit information generated by the electronic device 101 to the server. For example, when the user has launched and used a mobile game application, the communication circuit 190 may transmit, to the server, information finally stored after the use of the mobile game application. Furthermore, the communication circuit 190 may receive, from the server, information for implementing an operation to be performed by the electronic device 101. For example, when the user launches the mobile game application again, the communication circuit 190 may receive, from the server, information in which up to a lastly executed portion is stored.

The processor 120 may be operationally connected to the display 160. The processor 120 may provide image data so that the display 160 may display an image. The processor 120 may be operationally connected to the input device 150. The processor 120 may analyze a user input obtained from the input device 150, and may perform a preparation task for implementing an operation according to contents of the input. The processor 120 may be operationally connected to the communication circuit 190. The processor 120 may configure the type and contents of information transmitted/received by the communication circuit 190.

The EM sensing circuit 200 may receive an electromagnetic (EM) signal of at least one external electronic device 201 and 202.

According to an embodiment, the EM sensing circuit 200 may sense an EM signal having a frequency band of 1 MHz or less.

The EM sensing circuit 200 may generate first information based on the EM signal. The first information may include information about a waveform of the EM signal and information about the type of the at least one external electronic device 201 and 202 that has emitted the EM signal. The EM sensing circuit 200 may receive a first EM signal EM1 from a first external electronic device 201, and may generate first information about the first EM signal EM1 using an amplitude and phase of a waveform of the first EM signal EM1. The EM sensing circuit 200 may provide the first information about the first EM signal EM1 to the processor 120. The EM sensing circuit 200 may receive a second EM signal EM2 from a second external electronic device 202, and may generate the first information about the second EM signal EM2 using an amplitude and phase of a waveform of the second EM signal EM2. The EM sensing circuit 200 may provide the first information about the second EM signal EM2 to the processor 120.

The EM sensing circuit 200 may be operationally connected to the processor 120. The EM sensing circuit 200 may generate the first information about a plurality of EM signals EM1 and EM2 sensed in response to a control by the processor 120.

According to an embodiment, as illustrated in FIG. 2A, the electronic device 101 may store information related to the external electronic devices 201 and 202 in the EM sensing circuit 200 or the memory 130. The electronic device 101 may analyze the first information based on the information related to the external electronic devices 201 and 202. The processor 120 of the electronic device 101 may include an analysis unit (not shown) (or an analysis module) for analyzing the first information.

According to another embodiment, as illustrated in FIG. 2B, the electronic device 101 may transmit the first information generated by the EM sensing circuit 200 to the EM server 205 having information related to the external electronic devices 201 and 202. The electronic device 101 may send the first information itself to the EM server 205. The EM server 205 may receive the first information. The EM server 205 may analyze the first information based on the information related to the external electronic devices 201 and 202. The EM server 205 may transmit a result of analyzing the first information. The electronic device 101 may receive the result of analyzing the first information from the EM server 205 via the communication circuit 190.

According to an embodiment, as illustrated in FIG. 2A, the electronic device 101 may obtain the information related to the external electronic devices 201 and 202 and included in the first information by analyzing the first information. According to another embodiment, as illustrated in FIG. 2B, the electronic device 101 may receive, from the EM server 205, the information related to the external electronic devices 201 and 202 and included in the first information. For example, the first information may include information about the type and model name of the external electronic devices 201 to 202. The electronic device 101 may send the information about the type and model name included in the first information to the EM server 205, and may receive the result of analyzing the first information from the EM server 205. For another example, the first information may include information about an operation state of the external electronic devices 201 and 202 and about whether the external electronic devices 201 and 202 are able to execute a command.

The EM sensing circuit 200 may receive, from the processor 120, a control signal for controlling to transmit the first information to the EM server 205 via the communication circuit 190. The processor 120 may transmit, to the EM server 205, the first information generated by the EM sensing circuit 200 via the communication circuit 190.

According to an embodiment, the EM server 205 may include information about a plurality of EM signals. The EM server 205 may compare information about an EM signal included in the first information with pre-stored information about a plurality of EM signals. The EM server 205 may analyze which external electronic device the EM signal included in the first information has been output from. In various embodiments of the present disclosure, the EM server 205 may be referred to as a first server.

According to an embodiment, the EM server 205 may use the EM signal included in the first information to generate second information about the type of an external electronic device that has emitted the EM signal. According to an embodiment, the second information may include at least one of a model name, a manufacturer, or a manufacturing date of an external electronic device. According to an embodiment, the EM server 205 may use the EM signal included in the first information to determine that the type of an external electronic device is a 65-inch TV. The EM server 205 may transmit the generated second information to the electronic device.

The cloud server 206 may store information about a plurality of external electronic devices. The information about a plurality of external electronic devices may include, for example, a location, model name, manufacturer, or manufacturing date of an external electronic device. According to an embodiment, this information may include information about an access point to which the plurality of external electronic devices are connected.

The cloud server 206 may be, for example, a purchase server, an Internet of things (IoT) device control server, or a payment server. According to various embodiments, the cloud server 206 may be integrated into a single server together with the EM server 205.

According to an embodiment, the cloud server 206 may receive, from the electronic device 101, the second information and context information related to a current situation of the electronic device 101. Based on the second information and the context information, the cloud server 206 may select an external electronic device that satisfies a pre-specified condition from among the plurality of external electronic devices.

According to an embodiment, the cloud server 206 may request sensing information from the plurality of external electronic devices. The cloud server 206 may select one external electronic device from among the plurality of external electronic devices based on the second information and information about sensing signals received from the plurality of external electronic devices.

According to an embodiment, the cloud server 206 may include a database for each user account. According to an embodiment, the database may include at least portion of location information, a request device profile, a response device profile, or operation information.

According to an embodiment, the cloud server 206 may transmit, to a request device (e.g., the electronic device 101), operation information corresponding to the response device profile (profile of a selected external electronic device), the request device profile (e.g., profile of the electronic device 101), and the location information of the database.

The electronic device 101 according to an embodiment and the plurality of external electronic devices may be registered with the same user account in the cloud server 206. The user account of the electronic device 101 may be registered in the cloud server 206 when the user begins to use the electronic device 101. For example, when the user beings to use the electronic device 101 for the first time, the user account of the electronic device 101 may be generated using an email or registration identification according to a pre-configured system program. Thereafter, while using the electronic device 101, the user may register a first external device with the same user account as the user account registered in the cloud server 206. Alternatively, when beginning to use an external electronic device, the user may use the same user account as the user account of the electronic device 101.

For example, when using the electronic device 101, a search for external electronic devices such as TV, notebook computer, lighting, heating apparatus, refrigerator, or smart home appliance may be performed using a short-range communication scheme such as Bluetooth or near field communication (NFC), and found external electronic devices may be set as external electronic devices. Furthermore, target devices found and set as external electronic devices may be added to the user account. Alternatively, when setting the user account to use an external electronic device, the same user account as the user account registered in the electronic device 101 may be used.

According to an embodiment, upon receiving the second information from the electronic device 101, the cloud server 206 may select one external electronic device from among a plurality of external electronic devices registered with the same user account as the user account of the electronic device 101.

Figure 3A:
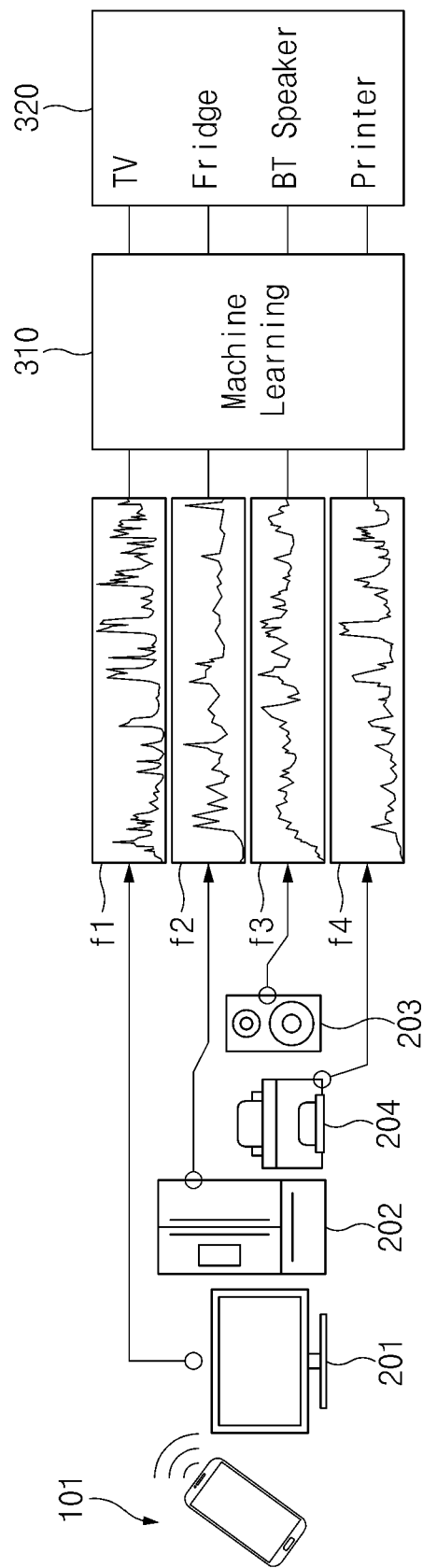
FIG. 3A is a conceptual diagram illustrating that external electronic devices are identified using an EM signal according to an embodiment.
Figure 3B:
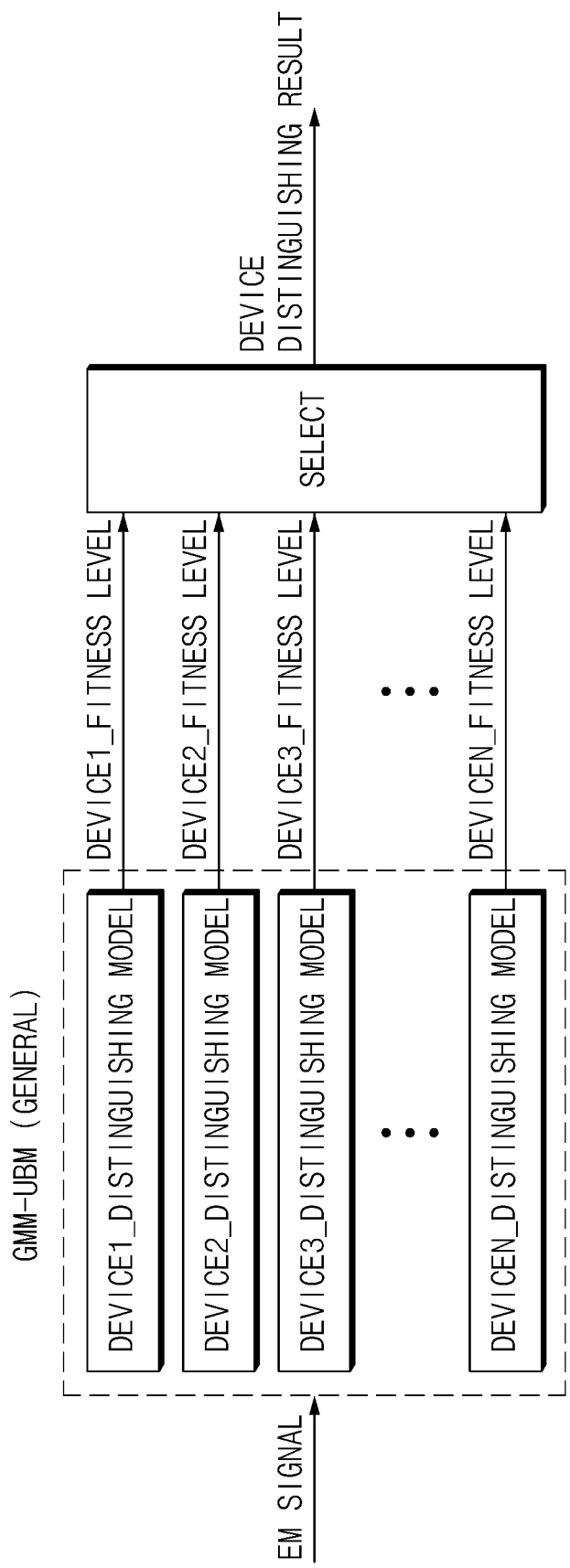
FIG. 3B is an exemplary block diagram illustrating machine learning according to an embodiment.

FIG. 3A is a conceptual diagram illustrating that external electronic devices 201, 202, 203, and 204 are identified using an EM signal according to an embodiment. FIG. 3B is an exemplary block diagram illustrating machine learning 310 according to an embodiment.

Referring to FIG. 3A, a plurality of external electronic devices 201, 202, 203, and 204 may be arranged around the electronic device 101. For example, a TV 201, a refrigerator 202, a Bluetooth speaker 203, and a printer 204 may be arranged around the electronic device 101. According to an embodiment, the plurality of external electronic devices 201, 202, 203, and 204 may include various electronic components therein. The plurality of external electronic devices 201, 202, 203, and 204 may emit various electromagnetic (EM) signals by virtue of electromagnetic interference (EMI) generated from internal electronic components. The EM signals may include a plurality of unique signals f1, f2, f3, and f4 within a set frequency range. The electronic device 101 may obtain EM signals of a specific frequency band among EM signals. For example, EM signals having a specific frequency within a frequency band of 1 MHz or less may be obtained through the EM sensing circuit 200.

Figure 4:
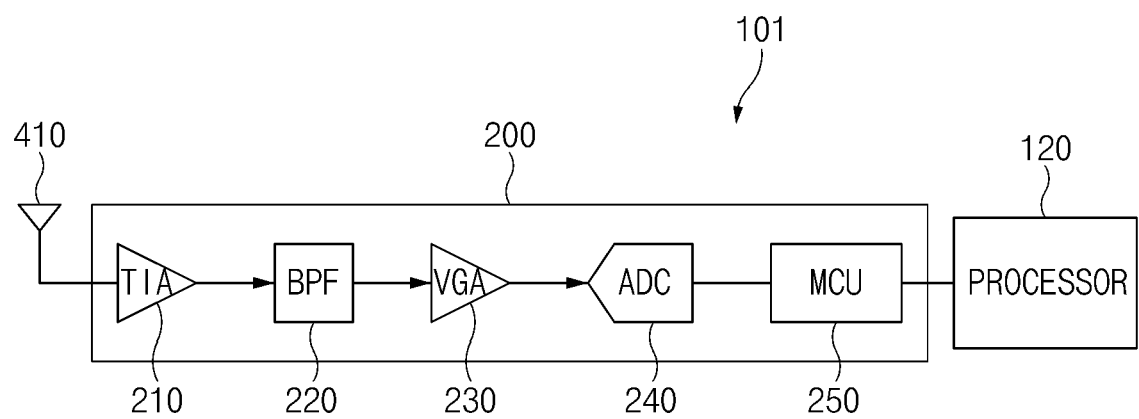
FIG. 4 is a block diagram illustrating components for performing EM sensing of an electronic device according to an embodiment.

According to an embodiment, when the electronic device 101 approaches one of the plurality of external electronic devices 201, 202, 203, and 204, the electronic device 101 may detect a unique signal caused by the above-mentioned electromagnetic interference through a sensing module (e.g., the EM sensing circuit 200 of FIGS. 2A and 2B) and a receiving module (e.g., the antenna 410 of FIG. 4). The electronic device 101 may transmit first information so that the EM server 205 may perform the marching learning 310. The electronic device 101 may determine and output an external electronic device 320 based on second information calculated through a process of the machine learning 310. According to an embodiment, information about an external electronic device may be displayed through a display (e.g., the display 160 of FIGS. 2A and 2B) of the electronic device 101. However, an embodiment is not limited thereto, and the information about an external electronic device may be output acoustically.

According to an embodiment, the electronic device 101 may include a memory (e.g., the memory 130 of FIG. 1), which stores a waveform table including a plurality of unique signals corresponding to the plurality of external electronic devices 201, 202, 203, and 204. According to an embodiment, in the case where the electronic device 101 includes the memory, which stores the waveform table including the plurality of unique signals corresponding to the plurality of external electronic devices 201, 202, 203, and 204, the processor 120 of the electronic device 101 may determine an external electronic device by comparing an EM signal obtained from the external electronic device with the unique signals included in the waveform table.

In another embodiment, after a function associated with EM sensing is activated, when the electronic device 101 comes close to any one among the plurality of electronic devices 201, 202, 203, and 204, the electronic device 101 may obtain the EM signal emitted from the external electronic device. The obtained EM signal may be analyzed by a classifier stored in the electronic device, or may be transmitted to a server (e.g., the EM server 205) which performs an EM signal analysis operation.

According to an embodiment, the classifier may perform an operation of distinguishing a model name of an external electronic device. The operation of distinguishing the model name of an external electronic device may be performed by a separate server (e.g., the cloud server 206), and the separate server may transmit learning data to the electronic device 101 after learning the distinguishing operation. The electronic device 101 may store the received learning data. Furthermore, the classifier may be continuously updated in order to improve recognition accuracy or add a target device. The learning algorithm may be a machine learning algorithm including at least one of deep learning, Gaussian mixture model (GMM), support vector machine (SVM), or random forest. According to various embodiments, the classifier for an EM signal may be differently implemented according to a machine learning algorithm.

For example, in the case where a GMM scheme is applied, the classifier may operate as illustrated in FIG. 3B. The electronic device 101 or the EM server 205 that has received the EM signal may have distinguishing models for each of a plurality of external electronic devices to which the machine learning 310 is applicable. The electronic device 101 or the EM server 205 may apply the EM signal to each of the distinguishing models to calculate a fitness level corresponding to each external electronic device. The electronic device 101 or the EM server 205 may distinguish the model name of an external electronic device using the fitness level. The electronic device 101 or the EM server 205 may have a frequency table in which various distinguishing models are applied while applying various machine learning algorithms.

For another example, the electronic device 101 or the EM server 205 may use a deep learning-based distinguishing model such as deep neural networks (DNNs) or convolutional neural networks (CNNs). In this case, unlike the case of using Gaussian mixture model-universal background model (GMM-UBM), the fitness levels of all of N number of devices may be calculated at one time.

According to another embodiment, the waveform table may be stored in the EM server 205 capable of communicating with the electronic device 101 via a network. For example, the processor 120 of the electronic device 101 may transmit the first information including the EM signal to the EM server 205. The EM server 205 may determine an external electronic device that has emitted the EM signal by comparing the EM signal included in the first information with the plurality of unique signals stored in the waveform table of the EM server 205. The EM server 205 may transmit information for identifying the determined external electronic device to the electronic device 101.

According to an embodiment, the electronic device 101 may execute a specific application based on identification information about a target device. For example, when the target device is identified as a TV, the electronic device 101 may automatically execute an application related to a remote controller capable of controlling the TV, and, simultaneously, may automatically connect to the TV. The electronic device 101 may be made stand by in a state of being capable of controlling the target device only by bringing the electronic device 101 close to the target device, thus improving convenience of the user.

FIG. 4 is a block diagram illustrating components of the electronic device 101 for performing EM sensing according to an embodiment.

The electronic device 101 may include an antenna 410 for detecting an EM signal emitted from a plurality of external electronic devices (e.g., the external electronic devices 201 and 202 of FIGS. 2A and 2B), the EM sensing circuit 200 for analyzing the detected EM signal, and the processor 120. According to an embodiment, the processor 120 of the electronic device 101 may identify a target device using detection information provided from the EM sensing circuit 200.

According to an embodiment, the EM sensing circuit 200 may include a trans-impedance amplifier (TIA) 210, a band pass filter (BPF) 220, a variable gain amplifier (VGA) 230, an analog-digital converter (ADC) 240, and a microcontroller unit (MCU) 250.

The antenna 410 may have a receiving bandwidth for receiving an EM signal. The trans-impedance amplifier 210 may amplify a frequency of 1 MHz or less received from the antenna 410. The band pass filter 220 may pass a frequency component specifying a characteristic pattern in an amplified signal received from the trans-impedance amplifier 210, and may filter noise that is a frequency component irrelevant to the characteristic pattern. According to an embodiment, the band pass filter 220 may pass a frequency component of 1 MHz or less in an EM signal, and may block a frequency component of higher than 1 MHz. According to an embodiment, the variable gain amplifier 230 may output a signal in a fixed level over a preset gain range in order to improve a noise characteristic of a filtered signal and an external interference signal removal characteristic. According to an embodiment, the analog-digital converter 240 may convert an analog signal provided from the variable gain amplifier 230 into a digital signal, and then may provide the digital signal to the MCU 250.

According to an embodiment, the MCU 250 may identify an external electronic device by comparing the EM signal converted into the digital signal with the waveform table stored in the electronic device 101. For example, the MCU 250 may compare a maximum amplitude of the EM signal and a waveform of the EM signal with a plurality of waveforms stored in the waveform table. The MCU 250 may provide identified information to the processor 120 of the electronic device 101. However, an embodiment is not limited thereto, and the MCU 250 may directly provide received identified information to the processor 120 of the electronic device 101. In this case, an operation of identifying a target device through waveform comparison may be performed by the processor 120 of the electronic device 101.

According to an embodiment, the electronic device 101 may be required to minimize noise generated by itself in order to detect an optimum input signal waveform. According to an embodiment, since a signal generated by the electronic device 101 may be applied to the EM sensing circuit 200, it may be necessary to perform a compensation for this signal application. According to an embodiment, in order to minimize an input error, the electronic device 101 may apply a compensation algorithm after recognizing internal noise due to a touch screen input, and may detect a distorted waveform according to a holding type when a plurality of antennas 410 are configured. According to various conditions of the electronic device 101, such as a touch input by the user or a state in which the electronic device 101 is held, an EM signal sensed by the electronic device 101 may differ from an EM signal generated by a target device. According to an embodiment, the electronic device 101 may compare a measured EM signal with unique electromagnetic interference detection information about the target device to continuously collect information. According to an embodiment, collected information may be used for electromagnetic interference detection correction after discovering a correlation with the electromagnetic interference detection information through big data analysis. The big data analysis may include techniques such as regression analysis and clustering or association analysis.

According to an embodiment, the processor 120 may control so that only EM signals which satisfy a set criterion among the EM signals generated by the external electronic device 201, 202, 203, or 204 are provided to the processor 120 in order for the EM sensing circuit 200 to selectively detect an EM signal.

Figure 5:
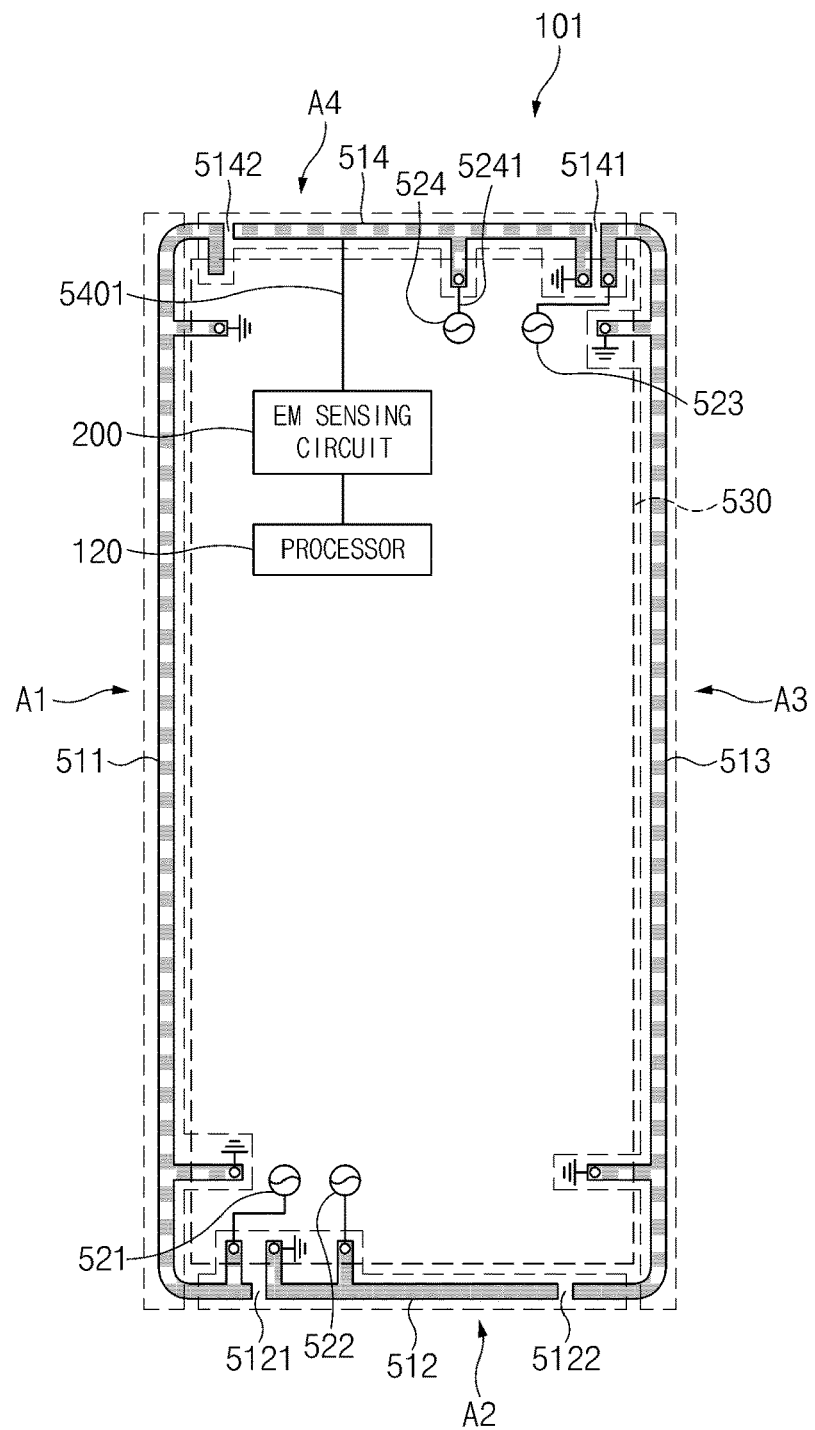
FIG. 5 is a planar diagram illustrating an antenna of an electronic device according to an embodiment.

FIG. 5 is a planar diagram illustrating an antenna of the electronic device 101 according to an embodiment. In the electronic device 101, an antenna for sensing an EM signal without distortion may be arranged so as to conform to an edge of the electronic device 101. In order to improve the efficiency of EM signal sensing, at least a portion of a housing defining a perimeter of the electronic device 101 may be used as an antenna.

Referring to FIG. 5, at least a portion of a housing used as an antenna of an electronic device (e.g., the electronic device 101 of FIGS. 2A and 2B) may be formed of a conductive member. According to an embodiment, the housing may be formed using a method in which a conductive member and a non-conductive member are double-shot injection molded. According to an embodiment, at least a portion of the housing may be arranged so as to be exposed along an edge of the electronic device.

According to an embodiment, the housing formed with a metal member may include a first side surface 511 having a first length, a second side surface 512 extending in a direction vertical to the first side surface 511 and having a second length, a third side surface 513 extending from the second side surface 512 in parallel with the first side surface 511 and having the first length, and a fourth side surface 514 extending from the third side surface 513 in parallel with the second side surface 512 and having the second length. According to an embodiment, the first side surface 511, the second side surface 512, the third side surface 513, and the fourth side surface 514 may be integrally formed. According to an embodiment, the first length may be longer than the second length.

According to an embodiment, the second side surface 512 may have formed therein a unit conductive portion electrically separated by a pair of non-conductive portions 5121 and 5122 spaced a fixed distance apart. Furthermore, the fourth side surface 514 may also have formed therein a unit conductive portion electrically separated by a pair of non-conductive portions 5141 and 5142 spaced a fixed distance apart. According to an embodiment, at least one of a plurality of conductive portions electrically separated by the non-conductive portions 5121, 5122, 5141, and 5142 may be electrically connected to feeding portions 521, 522, 523, and 524 electrically connected to a wireless communication circuit (not shown) arranged on a PCB 530, so as to be used as at least one antenna operating in a resonance frequency band. Antennas may be formed on the first side surface 511 to the fourth side surface 514. For example, the second side surface 512 may be configured as a second antenna portion A2 operating in a low band, and the fourth side surface 514 may be configured as a fourth antenna portion A4 operating in a mid band and a high band. However, an embodiment is not limited thereto, and the first side surface 511 may be configured as a first antenna portion A1, and the third side surface 513 may be configured as a third antenna portion A3.

According to various embodiments, the EM sensing circuit 200 may be electrically connected to a conductive member used as any one antenna portion among the first, second, third, and fourth antenna portions A1, A2, A3, and A4. According to an embodiment, the EM sensing circuit 200 may be electrically connected to the fourth side surface 514 that is most favorable for contacting or approaching an external electronic device without being affected by user's holding. According to an embodiment, the EM sensing circuit 200 may be connected to the communication circuit 524 by a conductive line 5241 so as to be electrically connected to the fourth side surface 514. According to an embodiment, the fourth side surface 514 may be interchangeably used as an antenna radiator for communication and an antenna radiator for electromagnetic interference detection. In this case, the EM sensing circuit 200 may detect an EM signal of an external electronic device using the fourth side surface 514, and may provide information about a detected signal to the processor 120 of the electronic device 101.

Hereinafter, it is assumed that the external electronic device 201, the electronic device 101, the cloud server 206, and the EM server 205 perform the process of FIG. 6A.

Figure 6A:
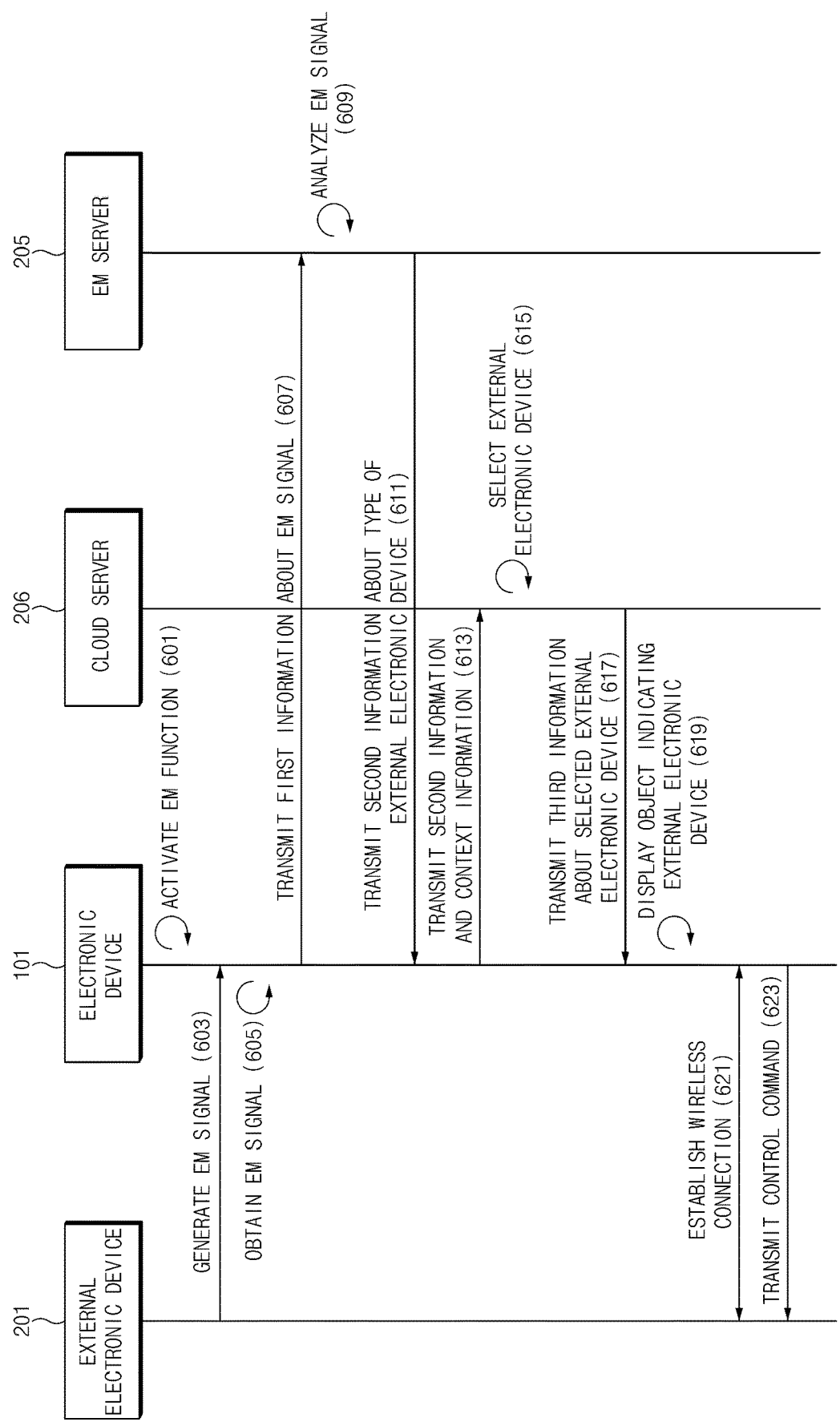
FIG. 6A is a flowchart illustrating a method of selecting an EM-sensed external electronic device according to an embodiment.

FIG. 6A is a flowchart illustrating a method of selecting an EM-sensed external electronic device according to an embodiment.

According to an embodiment, the electronic device 101 may execute an application for EM sensing before performing operation 601. According to an embodiment, a plurality of external electronic devices may be registered in the executed application. According to an embodiment, the plurality of external electronic devices registered in the application may also be registered in the cloud server 206. According to an embodiment, the user account of the external electronic devices registered in the cloud server 206 may be the same as the user account of the electronic device 101.

In operation 601, the electronic device 101 may activate an EM function by turning on the EM sensing circuit 200. When the EM sensing function is activated, an EM signal emitted from the external electronic device 201 that is a target device may be obtained.

According to an embodiment, the electronic device 101 may activate the EM sensing circuit when an application is executed. For example, the EM sensing circuit may be activated when an application related to an EM sensing operation is executed.

According to various embodiments, the processor may activate the EM sensing circuit when a display is turned on, when the electronic device 101 is located within a pre-specified range, when a pre-specified time has arrived, or when the electronic device is connected to a pre-specified external device.

In operation 603, the external electronic device 201 may generate an EM signal. The external electronic device 201 may generate the EM signal indicating a unique characteristic of the external electronic device 201 based on internal electronic components and an operation state. Furthermore, EM signals having different magnitudes and forms may be generated in an operation state and a stand-by state of the external electronic device 201.

According to an embodiment, the external electronic device 201 may also generate the EM signal before operation 601 is performed.

In operation 605, the EM sensing circuit 200 may obtain the EM signal emitted from the external electronic device 201. The EM sensing circuit 200 may provide the obtained EM signal to the processor 120. The processor 120 may generate first information at least partially including the received EM signal.

In operation 607, the processor 120 may transmit the first information to the EM server 205 via the communication circuit 190. For example, the first information transmitted to the EM server 205 may include at least a portion of the received EM signal.

In operation 609, the EM server 205 may analyze the EM signal. The EM server 205 may analyze the first information including the EM signal to generate second information about the type of the external electronic device. According to an embodiment, the second information may include at least one of a model name, a manufacturer, or a manufacturing date of the external electronic device.

In operation 611, the EM server 205 may transmit the second information to the electronic device 101.

In operation 613, the electronic device 101 may transmit the second information and context information about a current situation of the electronic device 101 to the cloud server 206 via the communication circuit 190.

According to an embodiment, the context information may include at least one of information about an operation being performed by the electronic device 101, information about a location of the electronic device 101, or information about an external device connected to the electronic device 101.

According to various embodiments, the electronic device 101 may select an external server to which the second information is to be transmitted from among a plurality of external servers based on the context information. The electronic device 101 may transmit the second information and the context information to the selected external server via a wireless communication circuit.

For example, if the processor is executing a payment application, the processor may determine the external server as a payment agency server. For another example, when the electronic device 101 is connected to a pre-specified access point, the processor may determine the external server as a server for controlling an IoT device.

In operation 615, the cloud server 206 may select, based on the second information and the context information, the external electronic device 201 which satisfies a pre-specified condition from among a plurality of external electronic devices (e.g., the first external electronic device 201 or the second external electronic device 202) registered in the cloud server 206.

According to an embodiment, the pre-specified condition may indicate an external electronic device which is closest to the electronic device 101 among a plurality of external electronic devices (e.g., the first external electronic device 201 or the second external electronic device 202) of a type according to the second information. In an embodiment, the cloud server 206 may include information about locations of a plurality of external electronic devices (e.g., the first external electronic device 201 or the second external electronic device 202), and the received context information may include information about the location of the electronic device 101. The cloud server 206 may select the external electronic device 201 which is located closest to the electronic device 101 among a plurality of external electronic devices (e.g., the first external electronic device 201 or the second external electronic device 202).

According to an embodiment, since the electronic device 101 obtains the EM signal of the external electronic device 201 that is close to the electronic device 101, the external electronic device 201 that has emitted the EM signal may be one which is closest to the electronic device 101 among a plurality of external electronic devices (e.g., the first external electronic device 201 or the second external electronic device 202).

According to an embodiment, the cloud server 206 may select the external electronic device 201 which is closest to the electronic device 101 among a plurality of external electronic devices (e.g., the first external electronic device 201 or the second external electronic device 202) using RSSI values from an access point of a place in which the electronic device 101 is located to the electronic device 101 and the external electronic device 201. Strength of an RSSI signal of wireless fidelity (WiFi) decreases as a distance increases. The cloud server 206 may select the external electronic device 201 which is closest to the electronic device 101 among a plurality of external electronic devices (e.g., the first external electronic device 201 or the second external electronic device 202) using an RSSI value that is inversely proportional to a distance.

According to an embodiment, the cloud server 206 may select the external electronic device 201 which is located closest to the electronic device 101 among a plurality of external electronic devices (e.g., the first external electronic device 201 or the second external electronic device 202) by receiving distance and direction information about the electronic device 101 and the external electronic device 201 from the access point and using the received distance and direction information.

An access point which uses 802.11.ad among WiFi communication standards may obtain not only distance information but also direction information about a connected device by receiving and sending a high-frequency signal. According to an embodiment, the cloud server 206 may select the external electronic device 201 by receiving the distance and direction information from the access point and using the received information.

The cloud server 206 may select the external electronic device 201 which is located closest to the electronic device 101 among a plurality of external electronic devices (e.g., the first external electronic device 201 or the second external electronic device 202) using an indoor positioning technique or using information about the location of the external electronic device 201 registered by the user aside from the above exemplary methods.

According to various embodiments, the pre-specified condition may indicate an external electronic device which is connected to the same access point as that of the electronic device 101 among a plurality of external electronic devices (e.g., the first external electronic device 201 or the second external electronic device 202) of a type according to the second information. In an embodiment, the cloud server 206 may include information about access points to which a plurality of external electronic devices (e.g., the first external electronic device 201 or the second external electronic device 202) are connected, and the context information may include information about the access point to which the electronic device 101 is connected. The cloud server 206 may select the external electronic device 201 which is connected to the same access point as that of the electronic device 101 among a plurality of external electronic devices (e.g., the first external electronic device 201 or the second external electronic device 202).

In operation 617, the cloud server 206 may transmit third information about the selected external electronic device 201 to the electronic device 101.

In operation 619, the electronic device 101 may display an object indicating the selected external electronic device 201 on a touch screen display (e.g., the display device 160) based on the received third information.

According to an embodiment, a plurality of external electronic devices (e.g., the first external electronic device 201 or the second external electronic device 202) may be a speaker located in a living room, a speaker located in a bedroom, or a speaker located in a kitchen, and the external electronic device 201 selected by the cloud server 206 may be the speaker located in the living room. The electronic device 101 may display an object indicating the speaker located in the living room on the touch screen display based on the third information.

In operation 621, the electronic device 101 may establish a wireless connection to the external electronic device 201 via the wireless communication circuit.

For example, the electronic device 101 may establish the wireless connection using Bluetooth, WiFi, or cellular communication.

According to various embodiments, operation 621 may be performed before any one of operations 601 to operation 619 is performed.

In operation 623, the electronic device 101 may transmit a control command to the external electronic device 201 through the established wireless connection.

In an embodiment, in the case where the external electronic device 201 is a speaker, the electronic device 101 may transmit a control command for increasing a sound volume of the speaker.

According to various embodiments, the cloud server 206 may transmit information about the electronic device 101 to the external electronic device 201. According to various embodiments, the cloud server 206 may request the external electronic device 201 to prepare to establish a wireless connection to the electronic device 101. According to various embodiments, the cloud server 206 may request the external electronic device 201 to prepare to receive a control command from the electronic device 101.

According to an embodiment, as illustrated in FIG. 2A, when at least one reference EM profile, at least one external access point, and information about a plurality of external electronic devices are stored in the memory 130 or the EM sensing circuit 200 of the electronic device 101, the following operations may be performed.

Hereinafter, it is assumed that the external electronic device 201 and the electronic device 101 perform the process of FIG. 6B.

Figure 6B:
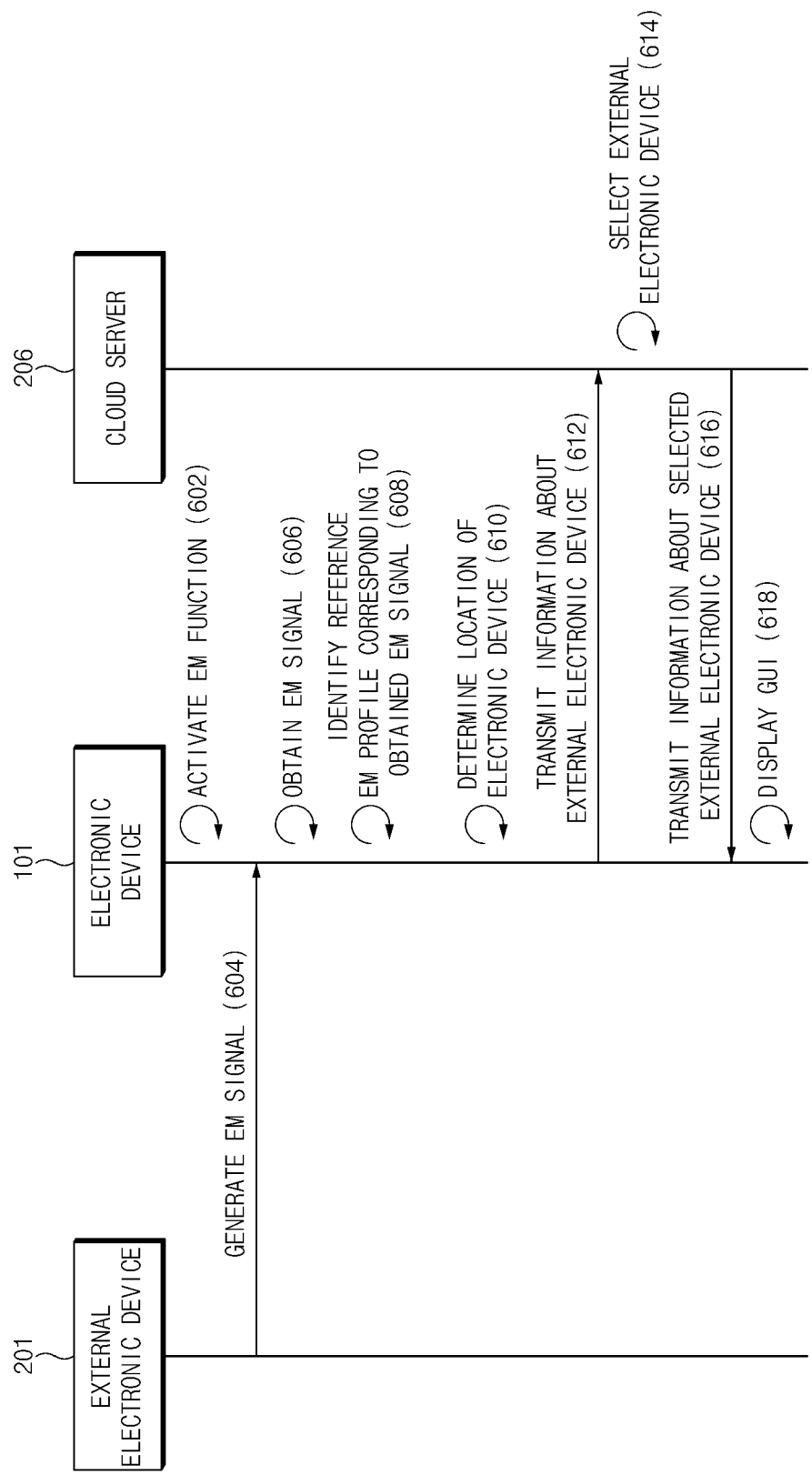
FIG. 6B is a flowchart illustrating a method of selecting an EM-sensed external electronic device according to an embodiment.

FIG. 6B is a flowchart illustrating a method of selecting an EM-sensed external electronic device according to an embodiment.

In operation 602, the electronic device 101 may activate an EM function by turning on the EM sensing circuit 200.

In operation 604, the external electronic device 201 may generate an EM signal.

In operation 606, the EM sensing circuit 200 may obtain the EM signal emitted from the external electronic device 201.

Operations 602 to operation 606 may correspond to above-described operation 601 to 605. According to an embodiment, examples related to operation 601 to operation 605 may also be applied to operation 602 to operation 606.

In operation 608, the processor 120 of the electronic device 101 may identify a reference EM profile corresponding to the obtained EM signal based on at least one reference EM profile.

For example, the processor 120 of the electronic device 101 may identify the reference EM profile corresponding to the obtained EM signal among reference EM profiles stored in the memory 130.

In operation 610, the processor 120 of the electronic device 101 may determine a location of the electronic device 101 at least partially based on information about an external access point connected to the electronic device 101 via a wireless communication circuit.

According to an embodiment, the information about an access point may include at least one of a device name, a MAC address, or location information of the access point.

According to an embodiment, the processor 120 of the electronic device 101 may determine the location of the electronic device 101 based on the location information about the external access point connected to the electronic device 101. For example, the processor 120 of the electronic device 101 may determine, as the location of the electronic device 101, a location of the external access point corresponding to a MAC address of the external access point connected to the electronic device 101.

In operation 612, the electronic device 101 may transmit information about an external electronic device to the cloud server 206 via the communication circuit 190.

According to an embodiment, the electronic device 101 may transmit location information about the electronic device 101 to the cloud server 206.

In operation 614, the cloud server 206 may select, based on the information about an external electronic device, the external electronic device 201 which satisfies a pre-specified condition from among a plurality of external electronic devices (e.g., the first external electronic device 201 or the second external electronic device 202) registered in the cloud server 206.

According to an embodiment, the pre-specified condition may indicate an external electronic device which is closest to the electronic device 101 among a plurality of external electronic devices (e.g., the first external electronic device 201 or the second external electronic device 202) of a type according to the second information. In an embodiment, the cloud server 206 may include information about locations of a plurality of external electronic devices (e.g., the first external electronic device 201 or the second external electronic device 202). The cloud server 206 may select the external electronic device 201 which is located closest to the electronic device 101 among a plurality of external electronic devices (e.g., the first external electronic device 201 or the second external electronic device 202).

In operation 616, the cloud server 206 may transmit information about the selected external electronic device 201 to the electronic device 101.

In operation 618, the processor 120 of the electronic device 101 may display a graphic user interface (GUI) on a display at least partially based on the received information about an external electronic device.

According to an embodiment, the graphic user interface may be associated with an application for generating a signal that controls an external electronic device.

According to an embodiment, the processor 120 of the electronic device 101 may establish a wireless connection to the external electronic device 201 via the wireless communication circuit, and may transmit a control signal to the external electronic device 201 using an application.

Hereinafter, it is assumed that the electronic device 101 of FIGS. 1, 2A, and 2B performs the process of FIG. 7. Operations described as being performed by an electronic device may be implemented as instructions (commands) that may be performed (or executed) by the processor 120 of the electronic device 101. The instructions may be stored in, for example, a computer recording medium or the memory 130 of the electronic device illustrated in FIG. 1.

Figure 7:
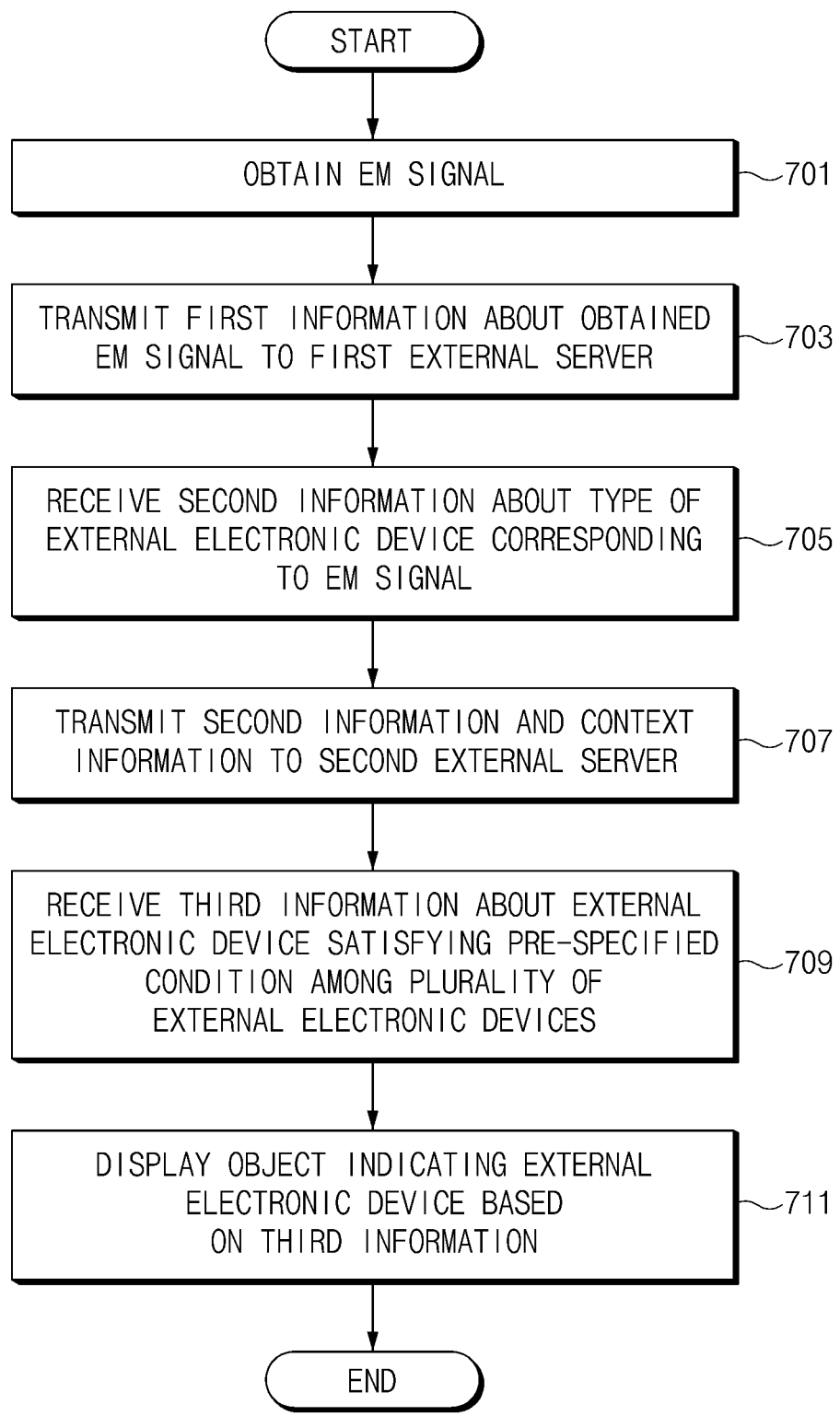
FIG. 7 is a flowchart illustrating a method for an electronic device to determine an EM-sensed external electronic device according to an embodiment.

FIG. 7 is a flowchart illustrating a method for an electronic device to determine an EM-sensed external electronic device according to an embodiment.

According to an embodiment, the processor 120 may execute an application to sense an EM signal before performing operation 701. According to an embodiment, a plurality of external electronic devices may be registered in the application.

In operation 701, the processor 120 may obtain an EM signal via an EM sensing circuit.

According to an embodiment, operation 701 may correspond to operation 605 of FIG. 6A.

In operation 703, the processor 120 may transmit first information based on the obtained EM signal to a first external server (e.g., the EM server 205) via the wireless communication circuit 190.

According to an embodiment, operation 703 may correspond to operation 607 of FIG. 6A.

In operation 705, the processor 120 may receive second information about the type of an external electronic device corresponding to the EM signal from the first external server via the wireless communication circuit 190.

According to an embodiment, operation 705 may correspond to operation 611 of FIG. 6A.

In operation 707, the processor 120 may transmit the received second information and context information about a current situation of the electronic device to a second external server (e.g., the cloud server 206) via the wireless communication circuit 190.

According to an embodiment, the context information may include at least one of information about an operation being performed by the processor 120, information about a location of the electronic device, or information about an external device connected to the electronic device.

According to an embodiment, operation 707 may correspond to operation 613 of FIG. 6A.

In operation 709, based on the second information and the context information, the processor 120 may receive third information about an external electronic device that satisfies a pre-specified condition among a plurality of external electronic devices from the second external server via the wireless communication circuit 190.

According to an embodiment, the pre-specified condition may indicate an external electronic device which is closest to the electronic device among a plurality of external electronic devices based on the second information.

According to various embodiments, the pre-specified condition may indicate an external electronic device which is connected to the same access point as that of the electronic device among a plurality of external electronic devices based on the second information.

According to an embodiment, operation 709 may correspond to operation 617 of FIG. 6A.

In operation 711, the processor 120 may display an object indicating the selected external electronic device on a touch screen display (e.g., the display device 160) based on the received third information.

According to an embodiment, the processor 120 may display, on the touch screen display, an object (e.g., control box) for receiving an input that controls an external electronic device.

According to an embodiment, operation 711 may correspond to operation 619 of FIG. 6A.

Figure 8A:
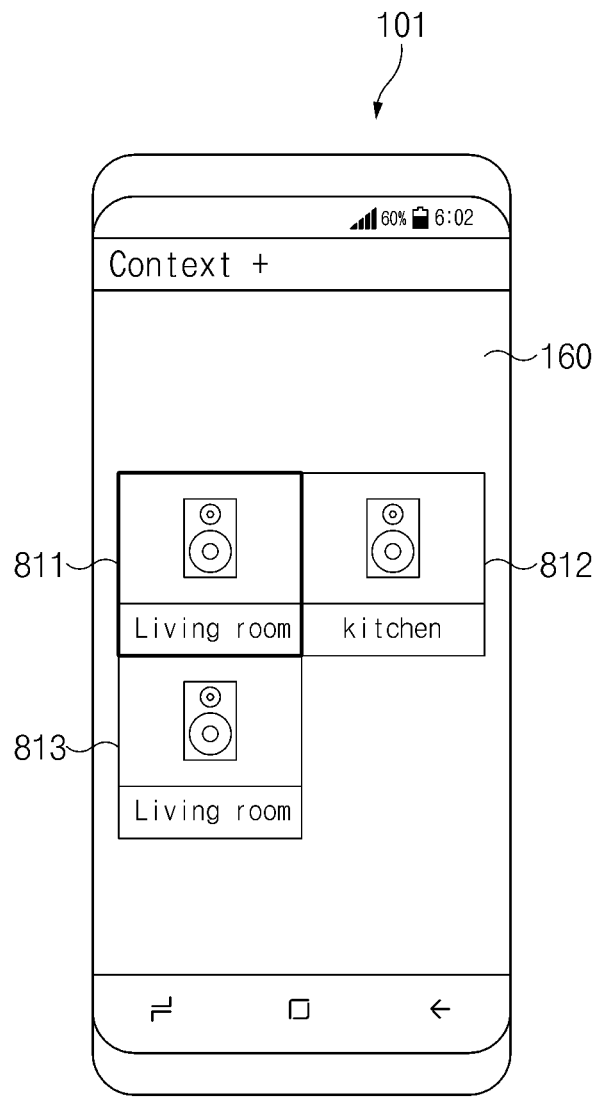
FIG. 8A is a diagram illustrating a plurality of external electronic devices registered in an application of an electronic device according to an embodiment.

FIG. 8A is a diagram illustrating a plurality of external electronic devices registered in an application of an electronic device according to an embodiment.

Figure 8B:
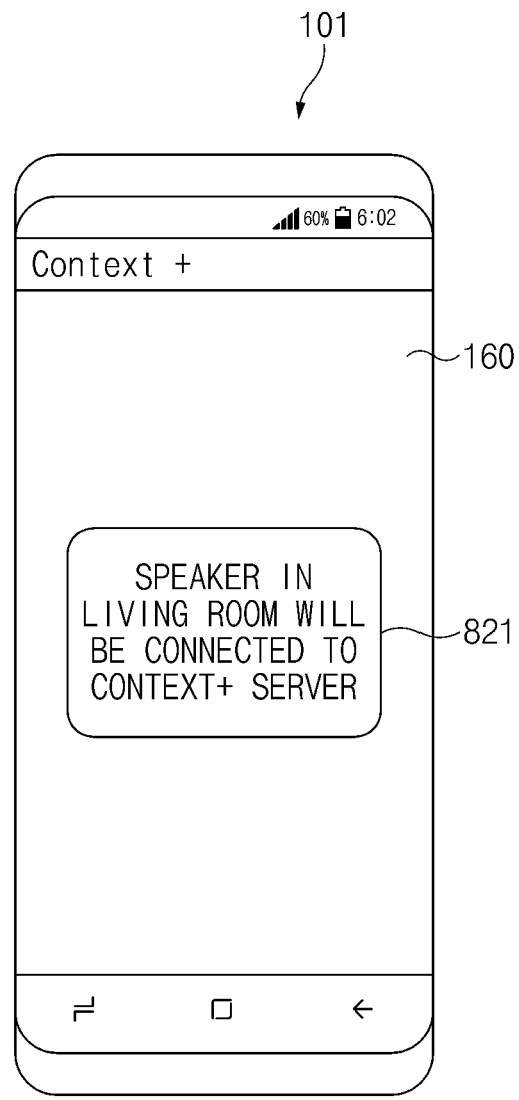
FIG. 8B illustrates a screen for notifying a selected external electronic device according to an embodiment.

FIG. 8B illustrates a screen for notifying a selected external electronic device according to an embodiment.

According to an embodiment, as illustrated in FIG. 8A, the processor 120 of the electronic device 101 may display, on the display 160, objects indicating a plurality of external electronic devices 811, 812, and 813 (e.g., speaker).

In an embodiment, the processor 120 may perform the operations described with reference to FIGS. 6A and 7, and may receive the third information about an external electronic device satisfying the pre-specified condition. In an embodiment, the external electronic device satisfying the pre-specified condition may be a speaker 811 located in a living room. The processor 120 may highlight an object indicating the speaker 811 located in the living room based on the third information, as illustrated in FIG. 8A.

According to an embodiment, the processor 120 may display, on the display 160, a message informing of connection to the speaker located in the living room, as illustrated in FIG. 8B.

According to various embodiments, the processor 120 may output a voice signal informing of a selected external electronic device through a speaker.

According to an embodiment, when a wireless connection is established between the electronic device and the external electronic device, the external electronic device may output a voice signal.

Hereinafter, it is assumed that the first external electronic device 201, the second external electronic device 202, the electronic device 101, the cloud server 206, and the EM server 205 perform the process of FIG. 9A.

Figure 9A:
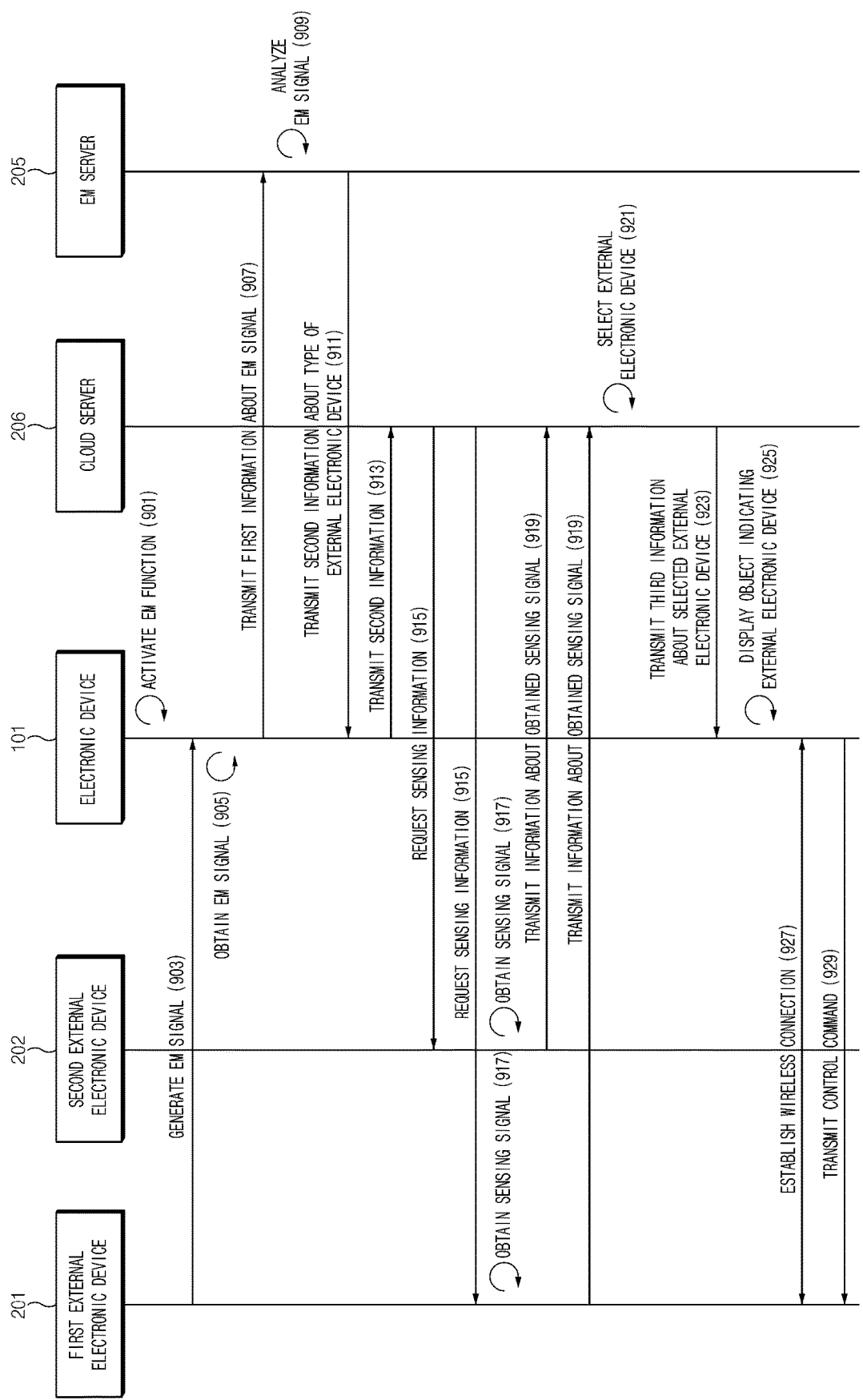
FIG. 9A is a flowchart illustrating a method of selecting an EM-sensed external electronic device according to an embodiment.

FIG. 9A is a flowchart illustrating a method of selecting an EM-sensed external electronic device according to an embodiment.

According to an embodiment, the electronic device 101 may execute an application for EM sensing before performing operation 901. According to an embodiment, a plurality of external electronic devices (e.g., the first external electronic device 201, the second external electronic device 202) may be registered in the executed application. According to an embodiment, the plurality of external electronic devices registered in the application may also be registered in the cloud server 206. According to an embodiment, the user account of the plurality of external electronic devices registered in the cloud server 206 may be the same as the user account of the electronic device 101.

In operation 901, the electronic device 101 may activate an EM function by turning on the EM sensing circuit 200. When the EM sensing function is activated, an EM signal emitted from the first external electronic device 201 that is a target device may be obtained.

According to an embodiment, the electronic device 101 may activate the EM sensing circuit when a specified application is executed. For example, the processor 120 may activate the EM sensing circuit 200 when an application related to an EM sensing operation is executed.

According to an embodiment, the electronic device 101 may obtain information about the location of the electronic device 101 via the wireless communication circuit 190. For example, the electronic device 101 may obtain information about the current location of the electronic device 101 via a GPS module. The electronic device 101 may activate the EM sensing circuit 200 when the location of the electronic device 101 falls within a pre-specified range.

According to an embodiment, the electronic device 101 may activate the EM sensing circuit 200 when the electronic device 101 is connected to a pre-specified external electronic device. For example, the electronic device 101 may activate the EM sensing circuit 200 when the electronic device 101 is wirelessly connected to a pre-specified access point.

According to various embodiments, the processor 120 may activate the EM sensing circuit 200 when the display 160 is turned on, when the electronic device 101 is located within a pre-specified range, when a pre-specified time has arrived, or when the electronic device is connected to a pre-specified external device.

In operation 903, the first external electronic device 201 may generate an EM signal. The first external electronic device 201 may generate the EM signal indicating a unique characteristic of the first external electronic device 201 based on internal electronic components or an operation state. Furthermore, EM signal having different magnitudes and forms may be generated in an active operation state and in a stand-by state of the first external electronic device 201.

According to an embodiment, the first external electronic device 201 may also generate the EM signal before operation 901 is performed. In operation 905, the EM sensing circuit 200 may obtain the EM signal emitted from the first external electronic device 201. The EM sensing circuit 200 may provide the obtained EM signal to the processor 120. The processor 120 may generate first information based on the EM signal.

In operation 907, the processor 120 may transmit the first information to the EM server 205 via the communication circuit 190. For example, the first information may include at least a portion of the received EM signal.

In operation 909, the EM server 205 may analyze the EM signal. The EM server 205 may analyze the first information including the EM signal to generate second information about the type of the first external electronic device 201. According to an embodiment, the second information may include at least one of a model name, a manufacturer, or a manufacturing date of the first external electronic device 201. For example, in operation 909, the EM server 205 may determine that the type of the first external electronic device 201 is a speaker by analyzing the first information including the EM signal, and may generate second information indicating that the type of the first external electronic device 201 is a speaker.

In operation 911, the EM server 205 may transmit the second information to the electronic device 101. In operation 913, the electronic device 101 may transmit the second information to the cloud server 206 via the communication circuit 190.

In operation 915, the cloud server 206 may request sensing information from the plurality of external electronic devices 201 and 202.

According to an embodiment, the cloud server 206 may request the sensing information from the plurality of external electronic devices 201 and 202 corresponding to the type according to the second information among a plurality of registered external electronic devices. For example, when a plurality of TVs, a plurality of speakers, and a plurality of air conditioners are registered in the cloud server 206, the cloud server 206 may request the sensing information from the plurality of speakers based on the second information.

According to various embodiments, the cloud server 206 may transmit a request for activating sensors of the plurality of external electronic devices 201 and 202 to the plurality of external electronic devices 201 and 202.

In operation 917, the plurality of external electronic devices 201 and 202 may obtain a sensing signal.

In operation 919, the plurality of external electronic devices 201 and 202 may transmit information about the obtained sensing signal to the cloud server 206.

According to an embodiment, the plurality of external electronic devices 201 and 202 may recognize a surrounding object through a camera sensor. According to an embodiment, the plurality of external electronic devices 201 and 202 may transmit, to the cloud server 206, information about an image obtained through the camera sensor or an object recognized through the camera sensor.

According to an embodiment, the plurality of external electronic devices 201 and 202 may recognize a surrounding object by sensing a sound wave signal. According to an embodiment, the plurality of external electronic devices 201 and 202 may transmit information about a recognized object or a sound wave signal to the cloud server 206.

According to an embodiment, the plurality of external electronic devices 201 and 202 may recognize a surrounding object using an ultra-wideband (UWB) sensor. According to an embodiment, the plurality of external electronic devices 201 and 202 may transmit information about a recognized object or an obtained signal to the cloud server 206. According to an embodiment, the plurality of external electronic devices 201 and 202 may recognize a surrounding object by obtaining a radio frequency (RF) signal. According to an embodiment, the plurality of external electronic devices 201 and 202 may transmit information about a recognized object or an RF signal to the cloud server 206.

According to an embodiment, the plurality of external electronic devices 201 and 202 may measure strength of an RF signal or a sound wave signal, and may transmit a measurement result to the cloud server 206. For example, the cloud server 206 may select the first external electronic device based on the received strength of the RF signal or sound wave signal.

According to an embodiment, the plurality of external electronic devices 201 and 202 may recognize a surrounding object using an EM sensing circuit. The plurality of external electronic devices 201 and 202 may transmit an obtained EM signal to the EM server 205, and may receive information about the electronic device 101 corresponding to the EM signal from the EM server 205. According to an embodiment, the plurality of external electronic devices 201 and 202 may transmit, to the could server 206, the EM signal or the information, received from the EM server 205, about the electronic device 101 corresponding to the EM signal.

In operation 921, the cloud server 206 may select the first external electronic device 201 from among the plurality of external electronic devices registered in the cloud server 206 based on the second information and information about the sensing signals obtained by the plurality of external electronic devices 201 and 202.

According to an embodiment, the cloud server 206 may select the first external electronic device 201 which has obtained the electronic device 101 from among the plurality of external electronic devices 201 and 202 of a type according to the second information using the information about the sensing signals.

According to an embodiment, the cloud server 206 may select the first external electronic device 201 which has obtained the EM signal of the electronic device 101 from among the plurality of external electronic devices 201 and 202 of the type according to the second information. For example, since the first external electronic device 201 which is close to the electronic device 101 may obtain the EM signal of the electronic device 101, the cloud server 206 may determine an external electronic device which has obtained the EM signal of the electronic device 101 as an external electronic device from which the electronic device 101 has received the EM signal.

In operation 923, the cloud server 206 may transmit third information about the selected external electronic device 201 to the electronic device 101.

In operation 925, the electronic device 101 may display an object indicating the selected external electronic device 201 on a touch screen display based on the received third information.

For example, the first external electronic device 201 may be a speaker located in a living room, the second external electronic device 202 may be a speaker located in a bedroom, and the selected first external electronic device 201 may be the speaker located in the living room. The electronic device 101 may display an object indicating the speaker located in the living room on the touch screen display based on the third information.

In operation 927, the electronic device 101 may establish a wireless connection to the first external electronic device 201 via the wireless communication circuit 190.

For example, the electronic device 101 may establish a wireless connection to the first external electronic device 201 using Bluetooth, WiFi, or cellular communication.

In operation 929, the electronic device 101 may transmit a control command to the first external electronic device 201 through the established wireless connection.

In an embodiment, in the case where the first external electronic device 201 is a speaker, the electronic device 101 may transmit a control command for increasing a sound volume of the speaker.

According to various embodiments, as illustrated in FIG. 2A, when at least one reference EM profile, at least one external access point, and information about a plurality of external electronic devices are stored in the memory 130 or the EM sensing circuit 200 of the electronic device 101, the following operations may be performed.

Hereinafter, it is assumed that the first external electronic device 201, the second external electronic device 202, the electronic device 101, and the cloud server 206 perform the process of FIG. 9B.

Figure 9B:
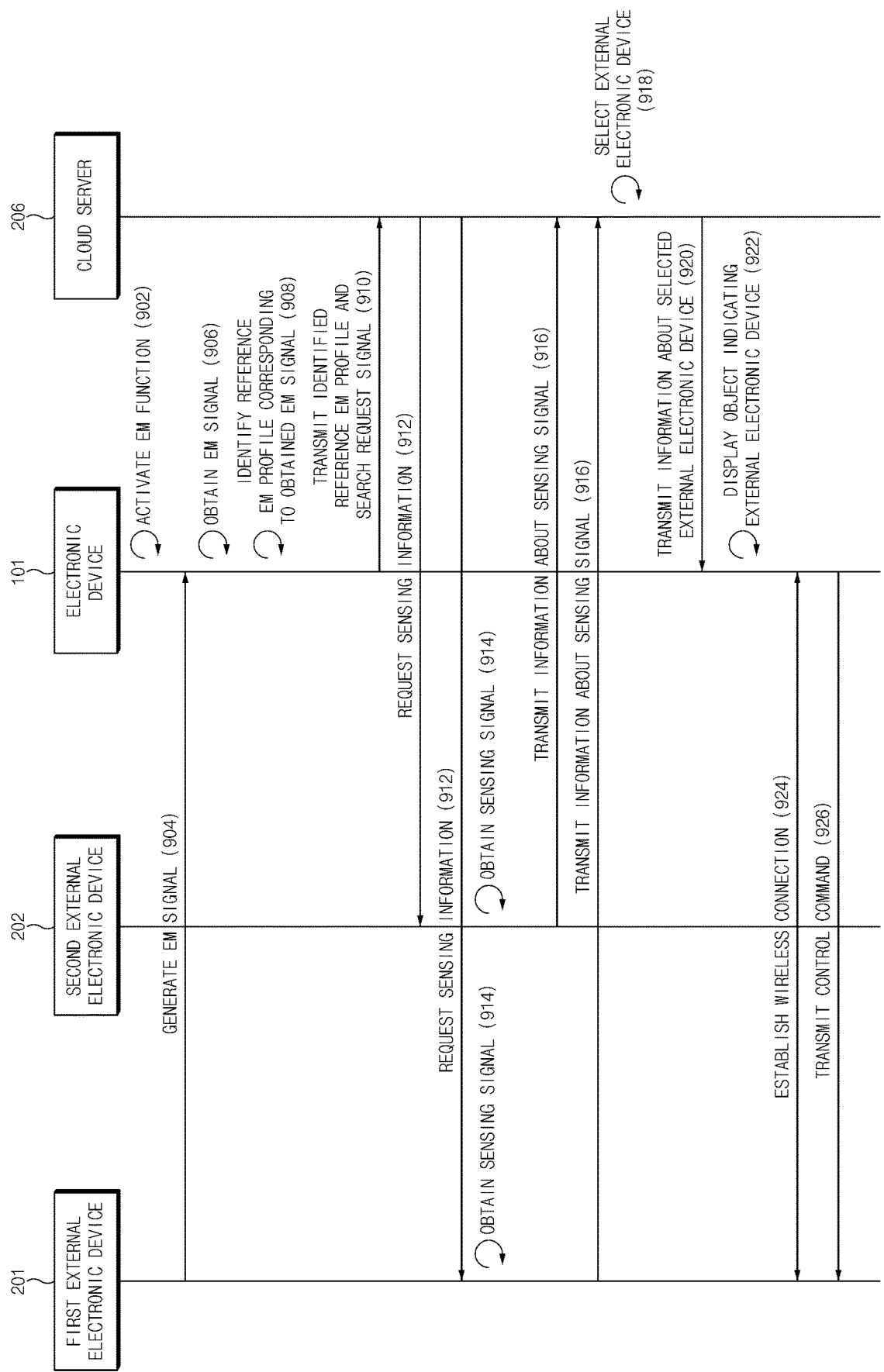
FIG. 9B is a flowchart illustrating a method of selecting an EM-sensed external electronic device according to an embodiment.

FIG. 9B is a flowchart illustrating a method of selecting an EM-sensed external electronic device according to an embodiment.

In operation 902, the electronic device 101 may activate an EM function by turning on the EM sensing circuit 200.

In operation 904, the first external electronic device 201 may generate an EM signal.

In operation 906, the EM sensing circuit 200 may obtain the EM signal emitted from the first external electronic device 201.

Operations 902 to operation 906 may correspond to above-described operation 901 to 905. According to an embodiment, examples related to operation 901 to operation 905 may also be applied to operation 902 to operation 906.

In operation 908, the processor 120 of the electronic device 101 may identify a reference EM profile corresponding to the obtained EM signal based on at least one reference EM profile.

For example, the processor 120 of the electronic device 101 may identify the reference EM profile corresponding to the obtained EM signal among reference EM profiles stored in the memory 130.

In operation 910, the processor 120 of the electronic device 101 may transmit the identified reference EM profile and an external electronic device search request signal to the cloud server 206 via the wireless communication circuit 190.

According to an embodiment, the processor 120 may further transmit context information related to a current situation of the electronic device to the cloud server 206 via the wireless communication circuit 190.

According to an embodiment, the external electronic device search request signal may include a request for activating sensors of a plurality of external electronic devices registered in the external server.

In operation 912, the cloud server 206 may request sensing information from the plurality of external electronic devices 201 and 202.

In operation 914, the plurality of external electronic devices 201 and 202 may obtain a sensing signal.

In operation 916, the plurality of external electronic devices 201 and 202 may transmit information about the obtained sensing signal to the cloud server 206.

Operations 912 to operation 916 may correspond to above-described operation 915 to 919. According to an embodiment, examples related to operation 915 to operation 919 may also be applied to operation 910 to operation 916.

In operation 918, the cloud server 206 may select an external electronic device from among the plurality of external electronic devices registered in the cloud server 206 based on the reference EM profile and information about the sensing signals obtained by the plurality of external electronic devices 201 and 202.

According to an embodiment, when the cloud server 206 has received the context information related to the current situation of the electronic device 101, the cloud server 206 may select the first external electronic device 201 based on the reference EM profile, the information about the sensing signals obtained by the plurality of external electronic devices 201 and 202, and the context information.

In operation 920, the cloud server 206 may transmit information about the selected external electronic device 201 to the electronic device 101.

In operation 922, the electronic device 101 may display an object indicating the selected first external electronic device 201 on a touch screen display based on the received information about the external electronic device 201.

In operation 924, the electronic device 101 may establish a wireless connection to the first external electronic device 201 via the wireless communication circuit 190.

In operation 926, the electronic device 101 may transmit a control command to the first external electronic device 201 through the established wireless connection.

Operations 920 to operation 926 may correspond to above-described operation 923 to 929. According to an embodiment, examples related to operation 923 to operation 929 may also be applied to operation 920 to operation 926.

Hereinafter, it is assumed that the electronic device 101 of FIGS. 1, 2A, and 2B performs the process of FIG. 10. Operations described as being performed by an electronic device may be implemented as instructions (commands) that may be performed (or executed) by the processor 120 of the electronic device 101. The instructions may be stored in, for example, a computer recording medium or the memory 130 of the electronic device 101 illustrated in FIG. 1.

Figure 10:
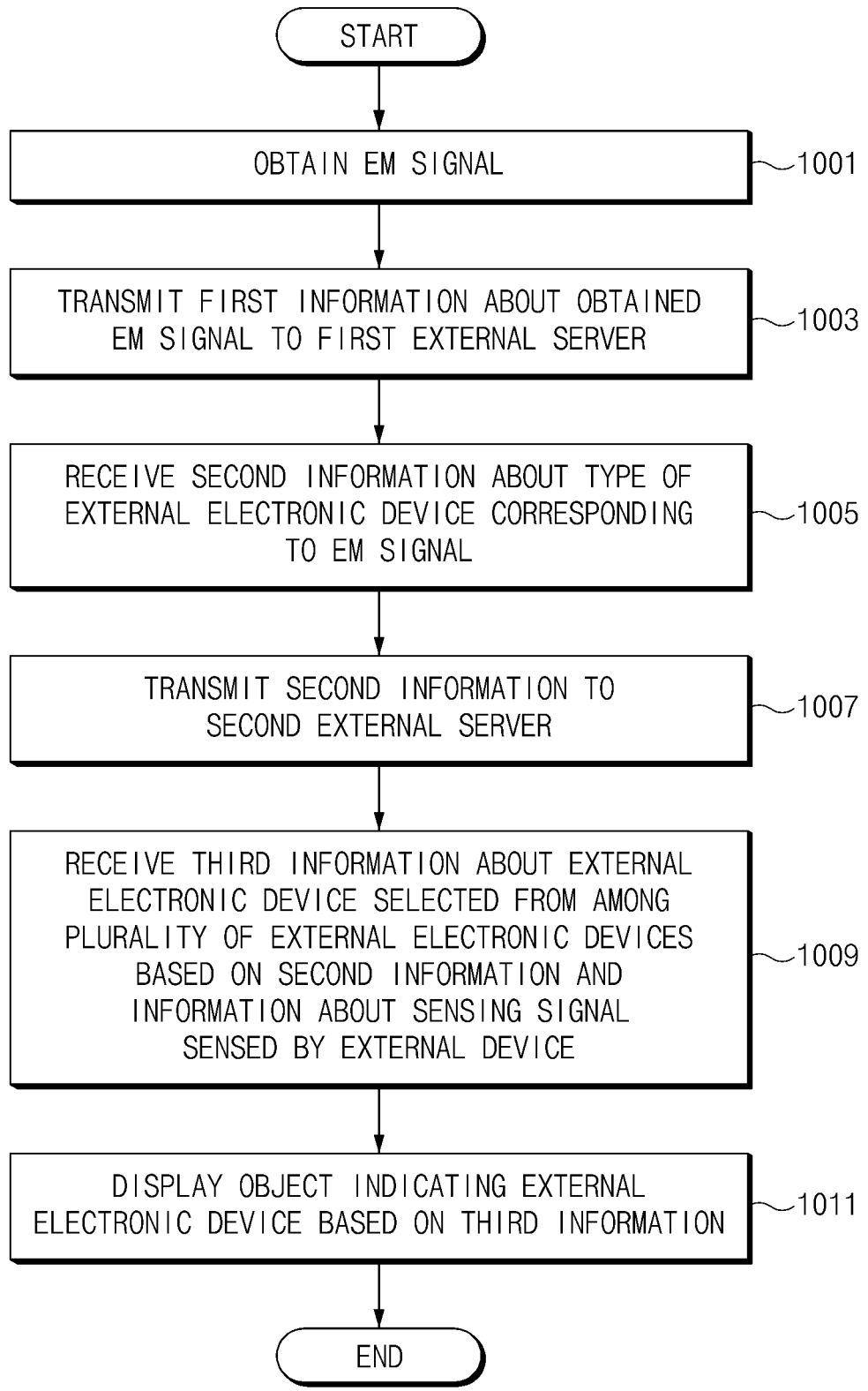
FIG. 10 is a flowchart illustrating a method for an electronic device to determine an EM-sensed external electronic device according to an embodiment.

FIG. 10 is a flowchart illustrating a method for an electronic device to determine an EM-sensed external electronic device according to an embodiment.

According to an embodiment, the processor 120 may execute an application to sense an EM signal before performing operation 1001. According to an embodiment, a plurality of external electronic devices may be registered in the application.

In operation 1001, the processor 120 may obtain an EM signal from an external electronic device (e.g., the first external electronic device 201) via an EM sensing circuit.

According to an embodiment, operation 1001 may correspond to operation 905 of FIG. 9A.

In operation 1003, the processor 120 may transmit first information about the obtained EM signal to a first external server (e.g., the EM server 205) via the wireless communication circuit 190.

According to an embodiment, operation 1003 may correspond to operation 907 of FIG. 9A.

In operation 1005, the processor 120 may receive second information about the type of an external electronic device corresponding to the EM signal from the first external server via the wireless communication circuit 190.

According to an embodiment, operation 1005 may correspond to operation 911 of FIG. 9A.

In operation 1007, the processor 120 may transmit the received second information to a second external server (e.g., the cloud server 206) via the wireless communication circuit 190.

According to an embodiment, operation 1007 may correspond to operation 913 of FIG. 9A.

In operation 1009, the processor 120 may receive third information about an external electronic device selected from among a plurality of external electronic devices from the second external server via the wireless communication circuit 190, based on the second information and information about sensing signals obtained by the plurality of external electronic devices.

According to an embodiment, the selected external electronic device may be one which has sensed the electronic device among the plurality of external electronic devices.

According to an embodiment, operation 1009 may correspond to operation 923 of FIG. 9A.

In operation 1011, the processor 120 may display an object indicating the selected external electronic device on a touch screen display based on the received third information.

According to an embodiment, the processor 120 may display, on the touch screen display, an object (e.g., control box) for receiving an input that controls an external electronic device.

According to an embodiment, operation 1011 may correspond to operation 925 of FIG. 9A.

Hereinafter, it is assumed that the electronic device 101 of FIGS. 1, 2A, and 2B performs the process of FIG. 11. Operations described as being performed by an electronic device may be implemented as instructions (commands) that may be performed (or executed) by the processor 120 of the electronic device 101. The instructions may be stored in, for example, a computer recording medium or the memory 130 of the electronic device 101 illustrated in FIG. 1.

Figure 11:
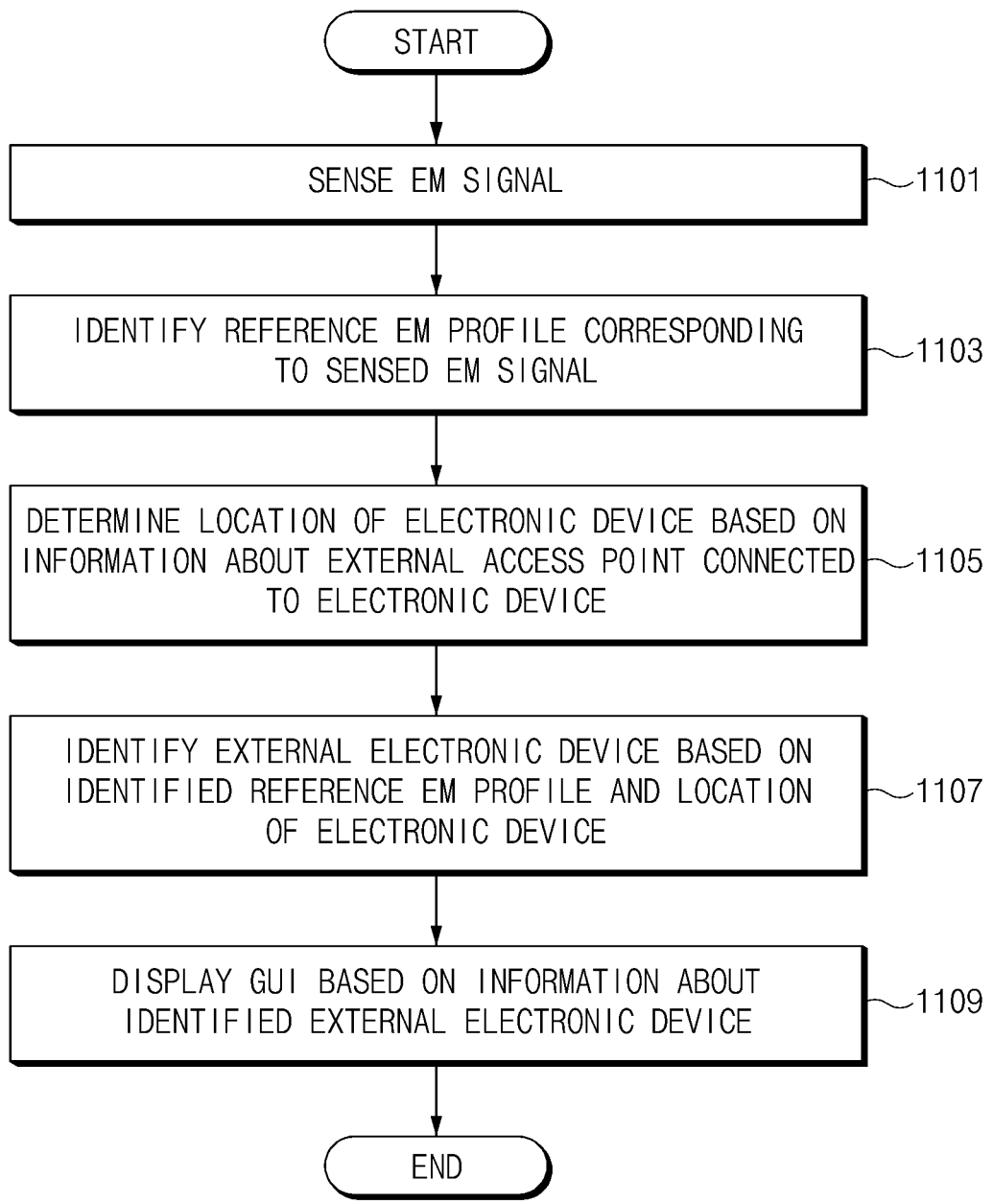
FIG. 11 is a flowchart illustrating a method for an electronic device to determine an EM-sensed external electronic device according to an embodiment.

FIG. 11 is a flowchart illustrating a method for an electronic device to determine an EM-sensed external electronic device according to an embodiment.

According to an embodiment, before operation 1101 is performed, the processor 120 may activate the EM sensing circuit 200 when receiving a signal from at least one external access point via the wireless communication circuit 190.

In operation 1101, the processor 120 may obtain an EM signal via the EM sensing circuit 200.

In operation 1103, the processor 120 may identify a reference EM profile corresponding to the obtained EM signal based on at least one reference EM profile.

For example, the processor 120 may identify the reference EM profile corresponding to the obtained EM signal among at least one reference profile stored in the memory 130.

In operation 1105, the processor 120 may determine a location of the electronic device at least partially based on information about an external access point connected to the electronic device.

In operation 1107, the processor 120 may identify an external electronic device at least partially based on the identified reference EM profile and the location of the electronic device.

According to an embodiment, the external electronic device may be associated with a user account related to the electronic device 101. For example, the electronic device 101 may identify an external electronic device at least partially based on the location of the electronic device 101 among a plurality of external electronic devices registered in the user account.

According to an embodiment, the processor 120 may identify an external electronic device based on a received signal strength indication (RSSI) received from an access point. For example, the processor 120 may identify an external electronic device corresponding to an RSSI value that is most similar to the RSSI value received from the access point as an external electronic device from which the electronic device has obtained the EM signal. For another example, the processor 120 may calculate a distance between the access point and the electronic device 101 based on the RSSI value received from the access point, and may identify an external electronic device based on the calculated distance.

In operation 1109, the processor 120 may display a graphic user interface (GUI) on a display at least partially based on information about the identified external electronic device.

According to an embodiment, the graphic user interface may be associated with an application for generating a signal that controls an external electronic device.

An electronic device 101 according to an embodiment of the present disclosure may include a housing, a touch screen display 160 exposed through a portion of the housing, at least one wireless communication circuit 190, an electromagnetic (EM) sensing circuit 200 configured to sense an EM signal having a frequency band of 1 MHz or less, a processor 120 operatively connected to the display 160, the wireless communication circuit 190, and the EM sensing circuit 200, and a memory 130 configured to store at least one reference EM profile and information about at least one external access point and operatively connected to the processor, wherein the memory 130 may store instructions that cause, when executed, the processor 120 to obtain an EM signal from an external electronic device 201 via the EM sensing circuit 200, identify a reference EM profile corresponding to the obtained EM signal based on at least one reference EM profile, determine a location of the electronic device 101 at least partially based on information about an external access point connected to the electronic device 101 via the at least one wireless communication circuit 190, identify the external electronic device 201 at least partially based on the identified reference EM profile, and display a graphic user interface (GUI) on the touch screen display 160 at least partially based on information about the identified external electronic device 201.

In an embodiment, the reference EM profile may include the information about the external electronic device 201.

In an embodiment, the information about the access point may include at least one of a device name, a MAC address, or location information of the access point.

In an embodiment, the graphic user interface may be associated with an application for generating a signal that controls the external electronic device 201.

In an embodiment, the memory 130 may store information about a user account related to the electronic device 101, and the external electronic device 201 may be associated with the user account.

In an embodiment, the instructions may cause the processor 120 to activate the EM sensing circuit when receiving a signal from the at least one external access point via the wireless communication circuit 190.

In an embodiment, the instructions may cause the processor 120 to identify the external electronic device 201 further based on a received signal strength indication (RSSI) received from the access point.

Furthermore, an electronic device 101 according to an embodiment of the present disclosure may include a touch screen display 160, a wireless communication circuit 190, an electromagnetic (EM) sensing circuit 200, which receives an EM signal, at least one processor 120 operatively connected to the touch screen display 160, the wireless communication circuit 190, and the EM sensing circuit 200, and a memory 130 configured to store at least one reference EM profile and operatively connected to the at least one processor 120, wherein the memory 130 may store instructions that cause, when executed, the processor 120 to obtain an EM signal from an external electronic device 201 via the EM sensing circuit 200, identify a reference EM profile corresponding to the obtained EM signal based on the at least one reference EM profile, transmit the identified reference EM profile and a request signal for searching for the external electronic device 201 to an external server 206 via the wireless communication circuit 190, receive information about the external electronic device 201 that satisfies a pre-specified condition from the external server 206 via the wireless communication circuit 190 based on the reference EM profile, and display an object indicating the selected external electronic device 201 on the touch screen display 160 based on the received information.

In an embodiment, the instructions may cause the at least one processor 120 to obtain information about a location of the electronic device 101 via the wireless communication circuit 190, and activate the EM sensing circuit 200 when the location of the electronic device 101 falls within a pre-specified range.

In an embodiment, the instructions may cause the at least one processor 120 to transmit context information related to a current situation of the electronic device 101 to the external server 206 via the wireless communication circuit 190, and the external electronic device 201 may be one that satisfies the pre-specified condition further base on the context information.

In an embodiment, the context information may include at least one of information about an operation being performed by the electronic device 101, information about a location of the electronic device 101, or information about an external device connected to the electronic device 101.

In an embodiment, the instructions may cause the at least one processor 120 to select the external server 206 from among a plurality of external servers 206 based on the context information about the current situation of the electronic device 101, and transmit the identified reference EM profile and the context information about the current situation of the electronic device 101 to the selected external server 206 via the wireless communication circuit 190.

In an embodiment, the external server 206 may include information about locations of the plurality of external electronic devices 201, the context information may include information about a location of the electronic device 101, and the pre-specified condition may indicate the external electronic device 201 which is closest to the electronic device 101 among the plurality of external electronic devices 201 based on the identified reference EM profile.

In an embodiment, the external server 206 may include information about an access point to which the plurality of external electronic devices 201 are connected, the context information may include information about an access point to which the electronic device 101 is connected, and the pre-specified condition may indicate the external electronic device 201 connected to the same access point as that of the electronic device 101 among the plurality of external electronic devices 201 based on the identified reference EM profile.

In an embodiment, the request signal for searching for the external electronic device 201 may include a request for activating sensors of the plurality of external electronic devices 201 registered in the external server 206.

In an embodiment, the instructions may cause the at least one processor 120 to establish a wireless connection to the selected external electronic device 201 via the wireless communication circuit 190.

In an embodiment, the instructions may cause the at least one processor 120 to transmit a control command to the external electronic device 201 via the established wireless connection.

Furthermore, a storage medium which stores computer-readable instructions according to an embodiment of the present disclosure may cause, when the instructions are executed by the processor 120 of the electronic device 101, the electronic device 101 to perform an operation of executing an application, an operation of obtaining an EM signal via an EM sensing circuit 200, an operation of transmitting first information about the obtained EM signal to a first external server 206, an operation of receiving second information about the type of an external electronic device 201 corresponding to the EM signal from a first external server 206, an operation of transmitting the received second information and context information about a current situation of the electronic device 101 to a second external server 206, and an operation of receiving, from the second external server 206, third information about an external electronic device 201 that satisfies a pre-specified condition among a plurality of external electronic devices 201 based on the second information and the context information, and displaying an object indicating the selected external electronic device 201 on a touch screen display 160 of the electronic device 101 based on the third information.

In an embodiment, the second external server 206 may include information about locations of the plurality of external electronic devices 201, the context information may include information about a location of the electronic device 101, and the pre-specified condition may indicate the external electronic device 201 which is closest to the electronic device 101 among the plurality of external electronic devices 201 of a type according to the second information.

In an embodiment, the electronic device 101 and the plurality of external electronic devices may be registered with the same user account in the cloud server 206.

The electronic device according to various embodiments of the present disclosure may be one of various types of devices. The electronic devices may include, for example, a portable communication device (e.g., a smartphone), a computer device, a portable multimedia device, a portable medical device, a camera, a wearable device, or a home appliance. The electronic devices according to an embodiment of the present disclosure are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
a housing;
a display exposed through a portion of the housing;
wireless communication circuit;
an electromagnetic (EM) sensing circuit configured to sense an EM signal having a frequency band of 1 MHz or less;
a processor operatively connected to the display, the wireless communication circuit, and the EM sensing circuit; and
a memory configured to store at least one reference EM profile and information about at least one external access point and operatively connected to the processor,
wherein the memory stores instructions that cause, when executed, the processor to:
sense a first EM signal of a first external electronic device and a second EM signal of a second external electronic device via the EM sensing circuit,
identify the first external electronic device by comparing a first wave form of the first EM signal to the at least one reference EM profile,
identify the second external electronic device by comparing a second wave form of the second EM signal to the at least one reference EM profile,
identify a distance between the first external device and the electronic device and a distance between the second external device and the electronic device based on information about an external access point connected to the electronic device via the wireless communication circuit,
select an external device which is closest to the electronic device among the first external electronic device and the second external electronic device, and
display a graphic user interface (GUI) on the display based on information about the selected external electronic device.

2. The electronic device of claim 1, wherein the reference EM profile includes the information about the first external electronic device and the second external electronic device.

3. The electronic device of claim 1, wherein the information about the access point includes at least one of a device name, a media access control (MAC) address, or location information of the access point.

4. The electronic device of claim 1, wherein the graphic user interface is associated with an application for generating a signal that controls the selected external electronic device.

5. The electronic device of claim 1, wherein the memory stores information about a user account related to the electronic device, and the selected external electronic device is associated with the user account.

6. The electronic device of claim 1, wherein the instructions cause the processor to activate the EM sensing circuit when receiving a signal from the at least one external access point via the wireless communication circuit.

7. The electronic device of claim 1, wherein the instructions cause the processor to identify at least one of the first external electronic device or the second external electronic device, further based on a received signal strength indication (RSSI) received from the access point.

8. An electronic device comprising:
a touch screen display;
a wireless communication circuit;
an electromagnetic (EM) sensing circuit, which receives an EM signal;
at least one processor operatively connected to the touch screen display, the wireless communication circuit, and the EM sensing circuit; and
a memory configured to store at least one reference EM profile and operatively connected to the at least one processor,
wherein the memory stores instructions that cause, when executed, the processor to:
obtain an EM signal from an external electronic device via the EM sensing circuit,
identify a reference EM profile corresponding to the obtained EM signal based on the at least one reference EM profile,
transmit the identified reference EM profile and a request signal for searching for the external electronic device to an external server via the wireless communication circuit,
receive information about the external electronic device that satisfies a pre-specified condition from the external server via the wireless communication circuit based on the reference EM profile, and
display an object indicating a selected external electronic device on the touch screen display based on the received information.

9. The electronic device of claim 8, wherein the instructions cause the at least one processor to:
obtain information about a location of the electronic device via the wireless communication circuit, and
activate the EM sensing circuit when the location of the electronic device falls within a pre-specified range.

10. The electronic device of claim 8,
wherein the instructions cause the at least one processor to transmit context information related to a current situation of the electronic device to the external server via the wireless communication circuit, and
wherein the external electronic device is one that satisfies the pre-specified condition further based on the context information.

11. The electronic device of claim 10, wherein the context information includes at least one of information about an operation being performed by the electronic device, information about a location of the electronic device, or information about an external device connected to the electronic device.

12. The electronic device of claim 10, wherein the instructions cause the at least one processor to:
select the external server from among a plurality of external servers based on the context information about the current situation of the electronic device, and
transmit the identified reference EM profile and the context information about the current situation of the electronic device to the selected external server via the wireless communication circuit.

13. The electronic device of claim 10,
wherein the external server includes information about locations of a plurality of external electronic devices,
wherein the context information includes information about a location of the electronic device, and
wherein the pre-specified condition indicates the external electronic device which is closest to the electronic device among the plurality of external electronic devices based on the identified reference EM profile.

14. The electronic device of claim 10,
wherein the external server includes information about an access point to which a plurality of external electronic devices are connected,
wherein the context information includes information about an access point to which the electronic device is connected, and
wherein the pre-specified condition indicates the external electronic device connected to the same access point as that of the electronic device among the plurality of external electronic devices based on the identified reference EM profile.

15. The electronic device of claim 8, wherein the request signal for searching for the external electronic device includes a request for activating sensors of a plurality of external electronic devices registered in the external server.

* * * * *